US011485078B2

United States Patent
Belcher et al.

(10) Patent No.: US 11,485,078 B2
(45) Date of Patent: Nov. 1, 2022

(54) ROBOT-MOUNTED 3D PRINTING APPARATUS

(71) Applicant: MOTHERSON INNOVATIONS COMPANY LIMITED, London (GB)

(72) Inventors: Simon Belcher, Lonsdale (AU); Dylan Thorpe, Lonsdale (AU); Peter Brown, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 124 days.

(21) Appl. No.: 16/968,257

(22) PCT Filed: Feb. 8, 2019

(86) PCT No.: PCT/EP2019/053143
§ 371 (c)(1),
(2) Date: Aug. 7, 2020

(87) PCT Pub. No.: WO2019/154991
PCT Pub. Date: Aug. 15, 2019

(65) Prior Publication Data
US 2021/0031449 A1    Feb. 4, 2021

(30) Foreign Application Priority Data
Feb. 9, 2018   (DE) .................... 10 2018 102 953.5

(51) Int. Cl.
*B29C 64/227*    (2017.01)
*B33Y 10/00*    (2015.01)
(Continued)

(52) U.S. Cl.
CPC .......... *B29C 64/227* (2017.08); *B29C 64/118* (2017.08); *B29C 64/209* (2017.08); *B29C 64/393* (2017.08); *B33Y 10/00* (2014.12); *B33Y 30/00* (2014.12); *B33Y 50/02* (2014.12); *B29K 2995/0056* (2013.01)

(58) Field of Classification Search
CPC ... B29C 64/227; B29C 64/118; B29C 64/209; B29C 64/393; B33Y 10/00; B33Y 30/00
See application file for complete search history.

(56) References Cited

U.S. PATENT DOCUMENTS

2016/0229121 A1*  8/2016 Ilic ....................... B29C 64/106
2017/0021566 A1    1/2017 Lund
(Continued)

FOREIGN PATENT DOCUMENTS

WO    WO 2008/103296 A1    8/2008

OTHER PUBLICATIONS

International Search Report dated May 23, 2019 of International application No. PCT/EP2019/053143.
(Continued)

*Primary Examiner* — Joseph S Del Sole
*Assistant Examiner* — Jamel M Nelson
(74) *Attorney, Agent, or Firm* — Jones Day

(57) ABSTRACT

The invention relates to a robot-mounted 3D printing apparatus for printing biocompatible materials for performing in-situ surgical repairs and comprises one UV curable reagent container and one cell supporting reagent container which are co-axially extruded from a tip and cured to perform in-situ repairs.

15 Claims, 14 Drawing Sheets

(51) Int. Cl.
*B33Y 30/00* (2015.01)
*B33Y 50/02* (2015.01)
*B29C 64/118* (2017.01)
*B29C 64/209* (2017.01)
*B29C 64/393* (2017.01)

(56) References Cited

U.S. PATENT DOCUMENTS

| 2017/0217088 | A1* | 8/2017 | Boyd, IV | B29C 64/209 |
| 2017/0335268 | A1* | 11/2017 | Maggiore | B29C 64/20 |
| 2018/0035689 | A1* | 2/2018 | Warner | B33Y 50/02 |
| 2020/0040291 | A1* | 2/2020 | Hakimi | B33Y 50/02 |

OTHER PUBLICATIONS

Written Opinion dated May 23, 2019 of International application No. PCT/EP2019/053143.

* cited by examiner

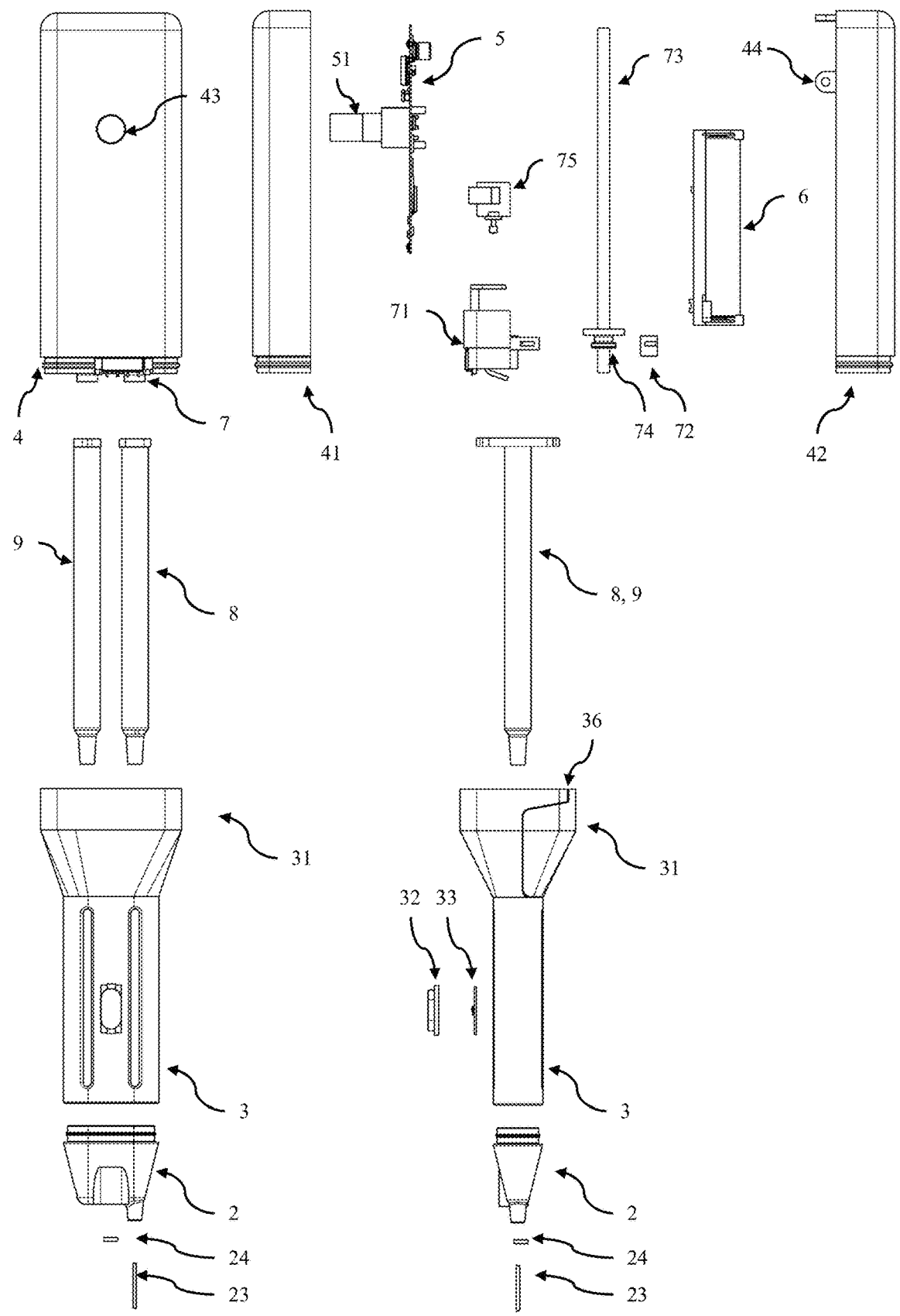

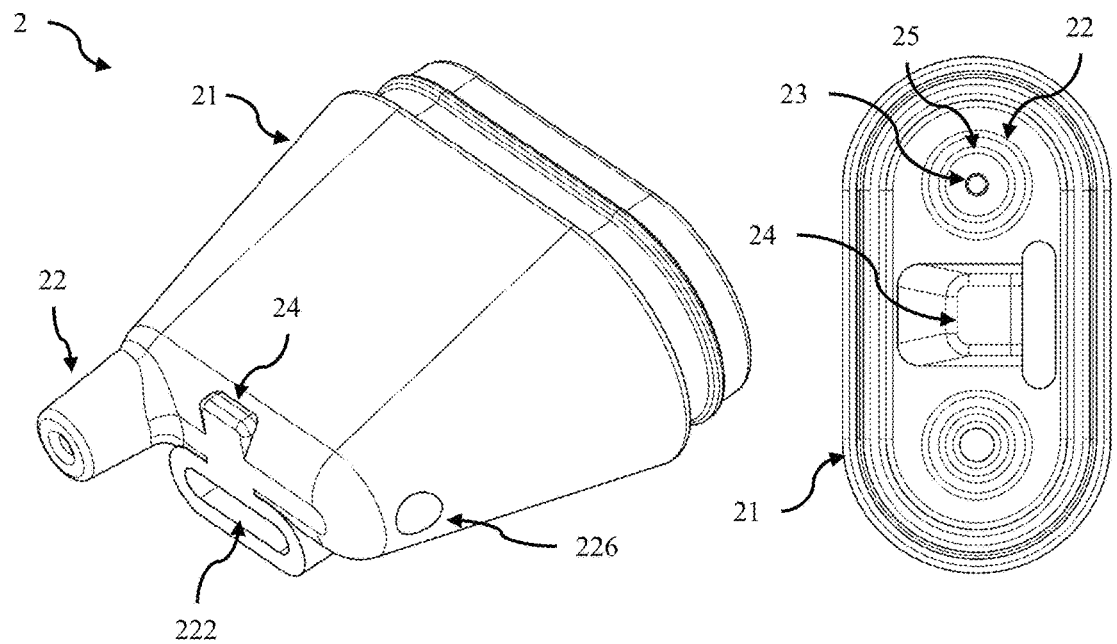
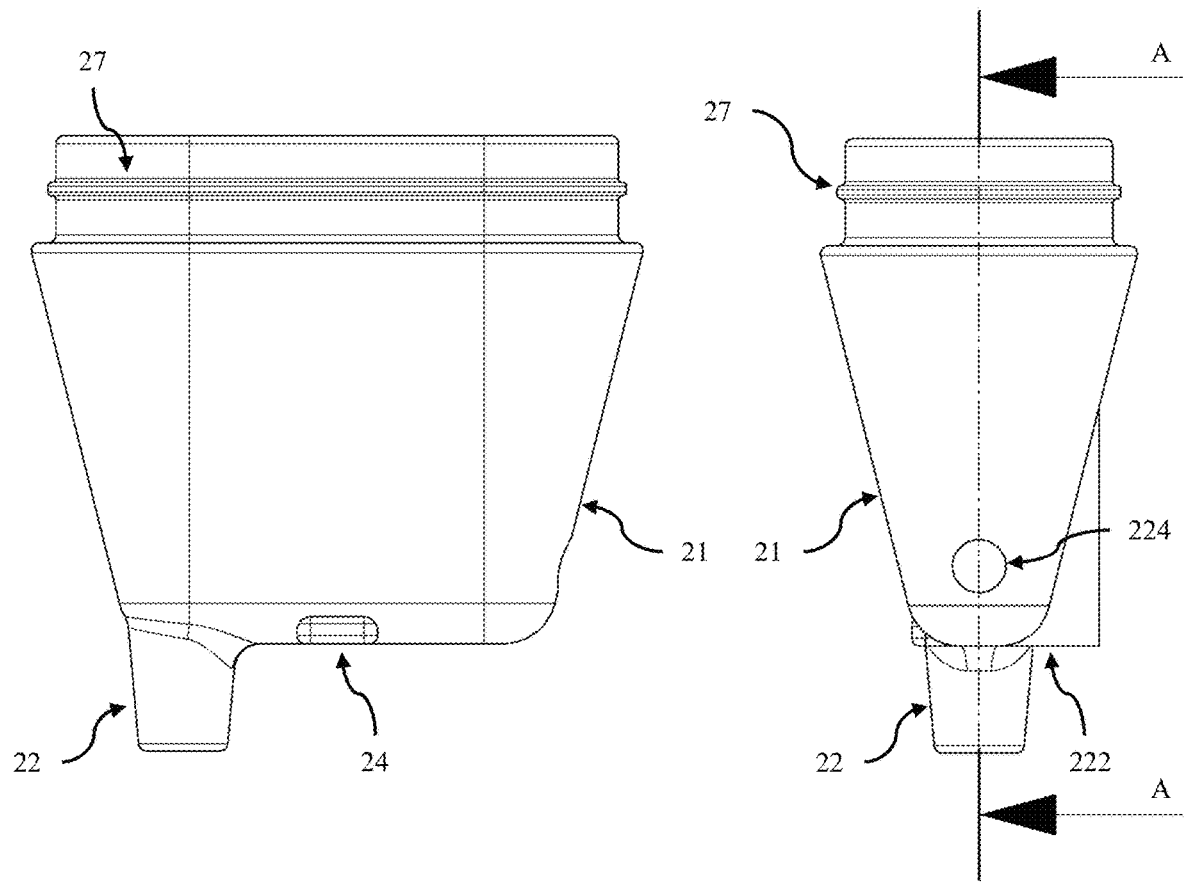
Figure 2A
Figure 2D
Figure 2B
Figure 2C

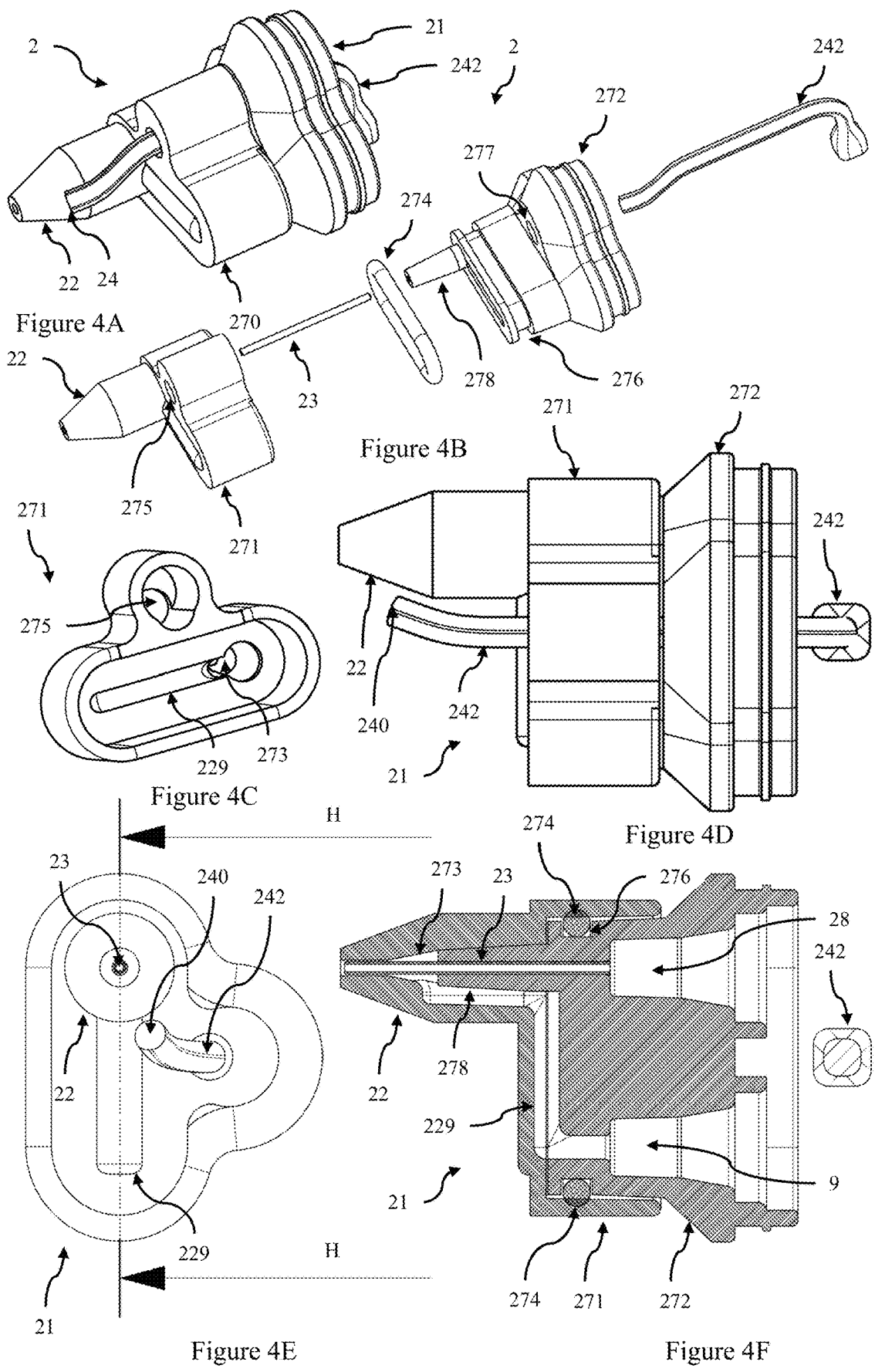

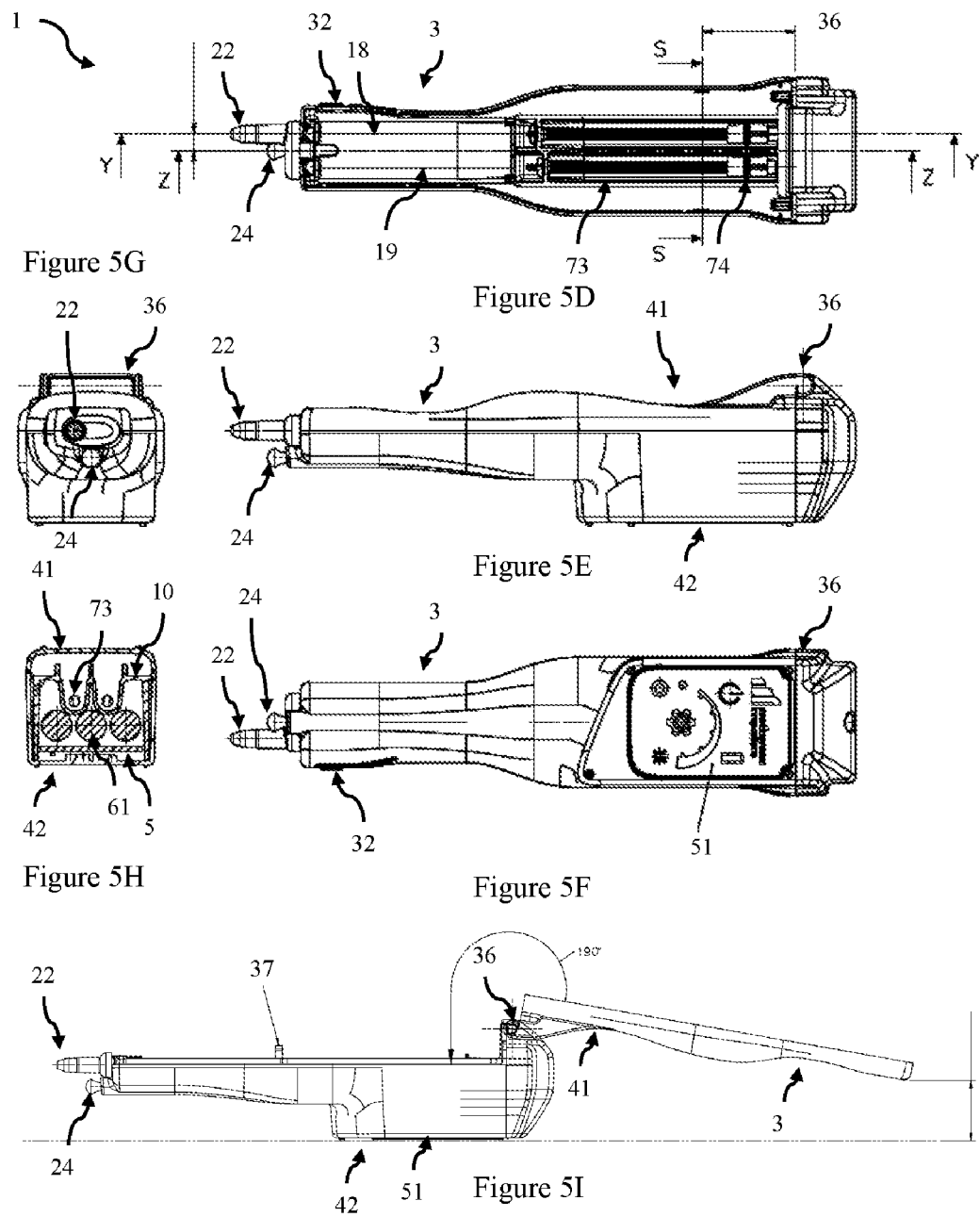

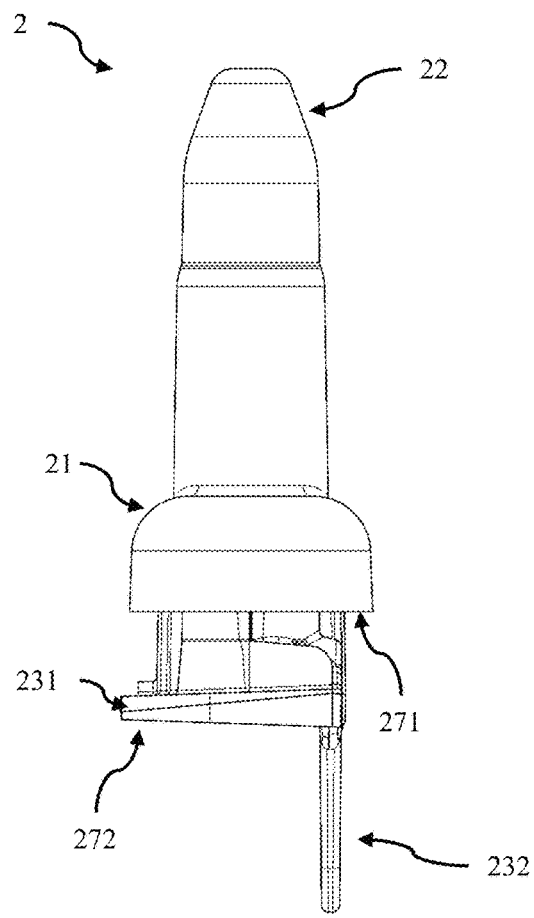
Figure 6A
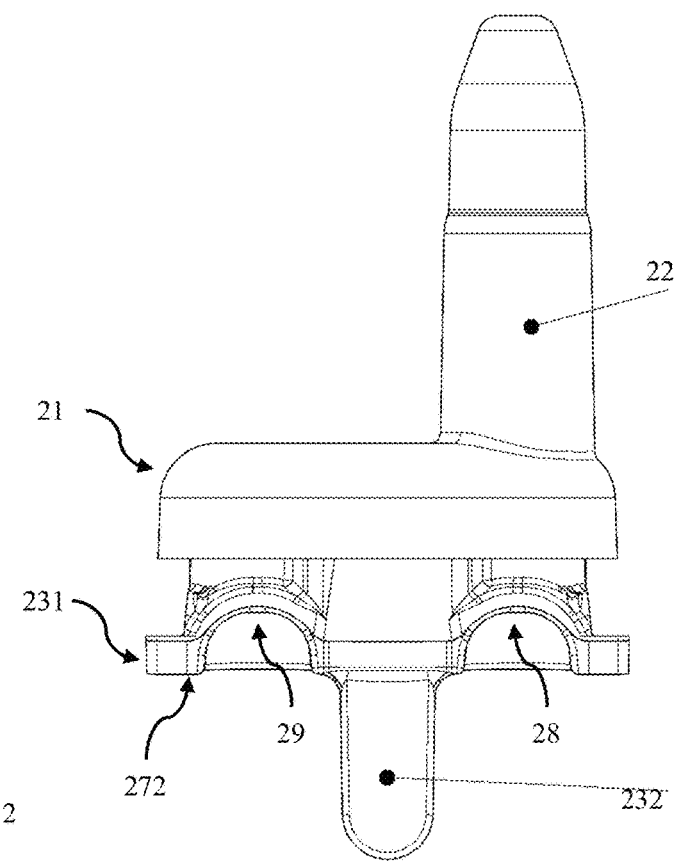
Figure 6B
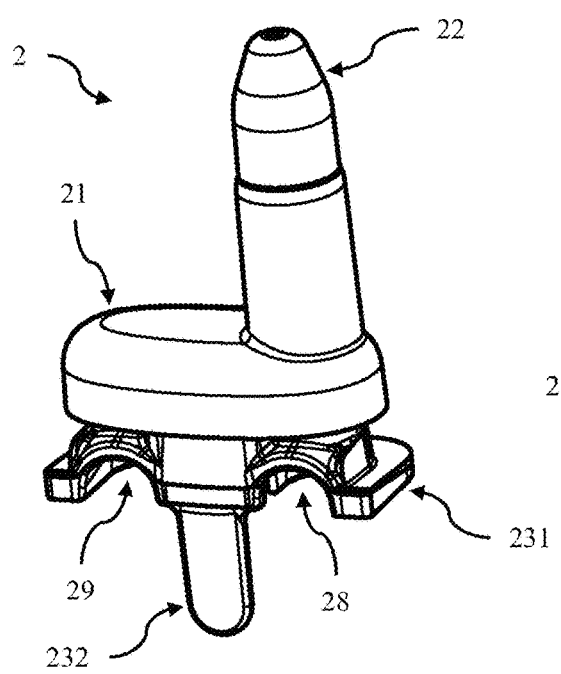
Figure 6D
Figure 6C

ROBOT-MOUNTED 3D PRINTING APPARATUS

CROSS-REFERENCE TO RELATED PATENT APPLICATIONS

This application is a National Stage Entry of International Patent Application No. PCT/EP2019/053143, filed Feb. 8, 2019, which claims the benefit of priority to German Patent Application No. DE 10 2018 102 953.5, filed Feb. 9, 2018, each of which is hereby incorporated by reference in its entirety for all purposes.

BACKGROUND

1. Field of the Invention

The present invention generally relates to additive manufacturing of biocompatible materials. In a particular form the present invention relates to a robot-mounted 3 dimensional (3D) printing apparatus for biocompatible materials, for example for surgical biofabrication.

2. Related Art

Laboratory studies and prototypes have established the technical feasibility of a 3D printer for surgical biofabrication. In one recent (although not necessarily well known) prototype system UV curable inks containing stem cells and biomaterials are in-situ printed and UV cured to allow a surgeon to biofabricate a tissue structure, for example to directly repair damaged cartilage. In this prototype system two reagent containers separately store the stem cells and biomaterial as hydrogels and a mechanical extrusion system is used to extrude the reagents through 3D printed titanium extruder nozzle, and a UV light source is used to cross-link the hydrogels immediately after extrusion to form a stable structure that encapsulates and supports the stem cells. A foot pedal is used to control reagent extrusion and the rate of extrusion is controlled using an electronic control interface. Each extruder has a circular cross section and is deposited co-axially with a core material containing the stem cells and a shell material which encapsulates and supports the core material.

However whilst technical feasibility has been established with the above discussed prototype, this prototype has a number of disadvantages, particular to enable cost effective production and reliable use. For example the prototype device suffers from reliability and consistency issues for example with regard to consistent extrusion rates, in particular with slight variations in material composition. The viscosity and thus flow rate of the reagents are sensitive to temperature and the material properties are sensitive to the mixing ratio. This then requires tight control of the extrusion rates. Furthermore, loading, cleaning and maintaining the system is somewhat cumbersome and complicated.

WO 2015/107333 discloses a stationary 3D printing device for facial prostheses that can be used only in an inflexible way with respect to the general handling and loading of printing materials. US 2016/0095956 deals with a modular article fabrication system. Again, the stationary system is rather inflexible and encompasses a cartridge system which necessitates several steps to for loading and unloading. US 2009/0000678 discloses a device for preparing microchannels and networks thereof. The system is an inflexible stationary system which does not allow for any easy replacing of materials.

Thus, it is broadly the object of the present invention to provide an improved 3D printing apparatus, which allows for easy mechanical extrusion to provide stable extrusion rates over a wide range of material properties. The apparatus should also be easy to use in terms of swapping and replacing materials and nozzle arrangements and should provide an improved flexibility with respect to its use.

SUMMARY

The object is solved by a robot-mounted 3D printing apparatus (1) for extruding multiple reagent compositions, the apparatus comprising:
  a detachable 3D printing device, wherein the detachable 3D printing device (1) is a handheld device, comprising a housing comprising:
    a first reagent container support arrangement (35) which in use receives and supports a first reagent container (8) containing a cell supporting reagent;
    a second reagent container support arrangement (35) which in use receives and supports a second reagent container (9) containing a light curable reagent;
    a power supply (6);
    an electric drive train arrangement (7) configured to drive a first reagent piston (84) into a distal end (81) of the first reagent container (8), and to drive a second reagent piston (94) into a distal end (91) of the second reagent container (9);
    an electronic control circuit (5) to control the electric drive train (7) to control extrusion of the reagents from the first and second reagent containers (8,9);
    a nozzle (2, 20, 120) connected at a distal end (3) to the housing and comprising a co-extrusion tip (22) comprising at least one aperture (23), and a first conduit for receiving the first reagent driven out of a proximal end of the first reagent container (8) and directing the first reagent out of the at least one aperture (23) in the tip (22), and a second conduit (26) for receiving the second reagent driven out of a proximal end of the second reagent container (9) and directing the second reagent out of the at least one aperture (23) in the tip (22);
  a multiaxial jointed robot-arm;
  a mount attached to one end of the multiaxial jointed arm, wherein the mount is configured to hold the detachable 3D printing device; and wherein the mount is configured to allow loading and replenish of the reagent containers.

In the inventive robot-mounted 3D printing apparatus the electric drive train arrangement may interface with standard commonly available syringe systems. This allows a widely application of the apparatus.

The inventive robot-mounted 3D printing apparatus may further comprise a light source mounted on or in the device. The light source may be controlled by the electronic control circuit for curing the reagents either just prior or after extrusion from the tip. As explained below, it is also encompassed by the present invention that the light source may be controlled by the robot control system in that the controls for the light source are transferred to the robot control system once the detachable 3D printing device is fixed in the mount attached to the robot-arm. For example, the light source may be mounted on the proximal end of the nozzle of the 3D printing device to irradiate the reagents after they are extruded from the tip. The light source may further comprise a lens so that the light may be focused in a zone at the end of the tip, for example 1-3 mm from the tip, 1-5 mm, 1-10 mm or any other suitable distance. Other light sources suitable for curing the reagents may be possible. The light source could be a UV light, such as a UV LED or UV laser diode, or any other light source suitable for curing extruded materials. The light source may additionally have focusing optics (lenses, etc) and guards or shields to block and control the emission direction. The UV light source may generate radiation, for example, in the wavelength from 100-420 nm, such as 200-420 nm or 300-420 nm. In one embodiment the wavelength is 350-420 nm. Depending on the materials used different curing wavelengths (not necessarily UV wavelengths) may be necessary, in which case the light source would be selected to match the curing wavelength.

In one embodiment the robot-mounted 3D printing apparatus has a light source that is mounted remote to the device. "Remote" in this context means that the light source is not an integral part of the device but is separate from it. In one embodiment the light source is mounted on the multiaxial jointed robot-arm. Preferably, the light source is located at the same end of the multiaxial jointed robot-arm as the mounted detachable 3D printing device. This design ensures that the light is generally in the most suitable position for curing the extruded materials. Further, in this embodiment the controls of the light source may also be transferred to the robot control system to facilitate the use thereof. In another embodiment the light source is a separate device totally remote from the robot-mounted 3D printing apparatus. Such a remote light source may be a handheld or portable (UV) light or a light source that is fixed to a support or carrier or fixed to a specific part of a room in which the inventive robot-mounted 3D printing apparatus is used, such as a wall or the ceiling.

The robot-mounted 3D printing apparatus of the invention allows for an easy replacement of the reagents in the device. The reagents can be easily swapped or replaced with 'plug and play' arrangement. This avoids cumbersome removing and mounting of the device and avoids stopping the extrusion process for an unnecessary and disadvantageous time. For example, the housing of the device can comprise a hinged portion to allow the housing to be opened to receive and load the reagent containers while the detachable 3D printing device is mounted to the apparatus. The part which can be opened from the housing, i.e. the part which is attached to the hinge may be an upper housing component. Such upper housing component may flip through the hinge through at least 90° up to 270° to provide internal access to allow loading of the (first and second) reagent containers. Hinging through an opening angle of up to a point where the upper end of the upper housing component is the same level of the lower housing is possible. The opening should be at least 90° in order to allow for an easy replacement of the reagent containers. On one embodiment the upper housing may flip through 90° to 270°, for example, the opening angle may be 90°, 100°, 110°, 120°, 130°, 140°, 150°, 160°, 170°, 180°, 190°, 200°, 210°, 220°, 230°, 240°, 250°, 260° or 270° or any other angle. A latch may be formed on the inside upper surface of the lower housing which engages with the inside of the upper housing to retain the upper housing in a closed position.

In a further embodiment of the inventive apparatus, the upper housing part of the device may be totally removable to open the device. This also allows for any easy replacement of one or more of the reagent containers.

With the invention also provided is the robot-mounted 3D printing apparatus in which the upper housing component may have a first aperture for viewing the reagents in the reagent containers. The upper portion of the housing may also be transparent to allow viewing of the reagent containers and actuators, wherein optionally the frame and upper portion of the housing are embossed with lettering to locate the reagents in the correct position in any of the embodiments described herein.

It is also proposed with the invention that the device of the robot-mounted 3D printing apparatus may further have one or more additional reagent container support arrangements which in use each receives and support an additional reagent container, and wherein the electric drive train arrangement is further configured to drive each additional reagent piston into a distal end of the additional reagent container, and the nozzle is further configured to receive the additional reagent driven out of a proximal end of each additional reagent container and co-extrude each additional reagent with the other reagents. The number of reagent containers and thus the number of reagents used with the inventive apparatus is not limited but dependents on the intended use.

In such embodiments, the detachable 3D printing device may comprise at the distal end of each reagent container a flange with a unique profile shape, and each reagent container support arrangement may comprise a cut-out portion matching the unique profile shape.

The present system could thus be easily extended to add reagent containers. i.e. using 3, 4, 5, 6, 7 or even more reagent containers. Generally, N materials and N associated reagent containers and drive assemblies may be used, wherein N is an integer, for example from 1 to 10. In other embodiments, other geometrical layouts could be used such as distributing the reagent containers and driver arrangements around a central axis (e.g. at 0°, 120° and 240° or the like) and redesigning the manifolds (or fluid delivery channels) in the nozzle. As the reagent containers can be easily replaced while the detachable 3D printing device is mounted to the apparatus, a plurality of reagent combinations can be extruded without cumbersome replacement of the whole device.

With the invention it is proposed that the nozzle of the robot-mounted 3D printing apparatus, i.e. of the detachable 3D printing device, is attachable to and removable from the device (the housing thereof) while the detachable 3D printing device is mounted to the apparatus. This allows for any easy and fast change of the extrusion results as, for example, different nozzles may only allow extrusion of material from some of the reagent containers loaded in the device while others are blocked. This also allows for different mixing of the reagents to provide specific extrusion results. Replacement of only the nozzle of the device also saves time as the extrusion process may only be stopped for a short period to replace the nozzle. In case a nozzle is clogged, time-consuming cleaning of the nozzle is also not necessary due to the possibility to quickly replace the nozzle. Due to this, replacement of the whole device can be avoided.

With the present invention a robot-mounted system is created where the extrusion and/or curing controls may be integrated into the robot control systems. This allows for a fully automated use of the inventive apparatus. This allows to run the apparatus with only one control system for the movement of the robot arm, the extrusion of materials from the detachable 3D printing device, i.e. the actual extrusion device, and the curing process. For example, a pre-set program may be run, wherein the operator may only carry out vernier adjustments. As mentioned above, in case the light source is an integral part of the device or the apparatus, the curing controls may also be integrated into the robot control system. With the robot control system it is possible to allow a user to control the rate of extrusion of the reagents from the reagent containers, and select between different, for example at least two, three, four or even more operating modes (for example manual and automatic). Controls which may be integrated within the robot control system are movement of the multiaxial robot arm, on/off power control, speed of extrusion, setting controls to allow a user to select an operating mode, for example one of a predefined set of operating modes, purging controls and a curing controls. The robot-control system may have a specific user-interface for operating the apparatus and/or the device.

The robot-control system and thus the robot may be operated and controlled with any suitable software. In one embodiment the robot control software of the system performs additional functions such as reloading or error detection. This may include detecting an empty reagent container condition (or full extension of the jack screw) in which case extrusion is ceased and the user is alerted to replace the reagent. Similarly the robot control software could detect an input from a user to change reagents and automatically shuts off the light source and retracts the piston actuators to allow reloading. The robot control software could also be used to control an initial purge to ready the device for operation. The robot control software could also monitor the drive arrangement or flow through the tip and detect an extrusion error (e.g. blocked extruder or blocked tip) in which case operation is ceased and the user alerted. The robot control software could also detect failure of the light source in which case extrusion is ceased and the user is alerted. The user could be alerted using one or more externally visible LED's located either in the device or the apparatus. In one embodiment the electronic control circuit comprises a wireless communications chip to allow wireless control of the apparatus. The robot control software may perform the above tasks by turning on an acoustic signal instead of using visible LED's. In one embodiment a combination of acoustic and light signals may be used.

The robot control software defines the sequence or combination of movements, extrusion of each reagent, and curing light operation specific to a particular target application. The robot control software may be configured to complete multiple identical sequences to create a series of identical components. This may facilitate routine operations carried out with the robot-mounted 3D printing apparatus. The robot control software may also be set with a specific program for a specific application. The robot control software may contain a library of basic operations which may be used as such or which may be altered depending on the desired operation sequence. The sequence of motion may also, for example, be derived from import of a 3D model generated through an external computer aided design software package, or manually input numerically directly into the control software. The robot control software allows for every movement and rotation necessary for the specific purpose.

In some embodiments the viscosity of reagents is temperature dependent and thus in some embodiments heating elements and sensors such as a Peltier cell system are provided, for example in the device and the electronic control circuit is used to heat and then maintain the temperature of inserted reagent containers at a predefined temperature. Control of the temperature can also be used as a form of speed control (or in conjunction with speed control) by enabling control of the viscosity. Alternatively one or more temperature sensors may be included and the control system may vary the extrusion rate (e.g. stepper motor speed) of the reagents to compensate for changes in viscosity or mixing rate with temperature to ensure consistent application or mixing of the reagents. This may be based on calibration data.

In one embodiment the desired speed control or flow rate setting for a reagent is encoded on the reagent container so that when inserted in the device a sensor reads or detects the encoded speed control or flow rate setting, and sends this information to the microcontroller. The microcontroller can then use this information to set the speed of the corresponding stepper motor. In some embodiment the encoded value may be a voltage or current level which the microcontroller can directly use, or the microcontroller may store sets of predefined speeds/control values each associated with a code, and thus by reading the code on the reagent container the microcontroller can look up the appropriate speed setting. The encoding maybe a physical encoding such as projection in a defined location on the flange which engages a switch, or a barcode or similar code printed on the reagent which is scanned and read by a light sensor in the handgrip housing.

With the control system, the rate of extrusion of the reagents is independently controllable. This means, that depending on the intended use one of the reagents may be extruded at a different speed than the other. The rate or ratio may be adapted during the extrusion process at any time. In one embodiment the rate of extrusion of the reagents is a mechanically fixed ratio.

The robot-mounted 3D printing apparatus may also be configured to be operated manually, wherein, for example, movement of a hand or an arm of a user is transferred (via a suitable device) directly to the movement of the apparatus.

The detachable 3D printing device may be a handheld printing device, i.e. the device can also be operated independent from the robot system described herein. In this case the detachable 3D printing device is controlled by a suitable user interface which is an integral part of the device. According to the present invention, once the detachable 3D printing device is fixed in the mount of the apparatus, all controls of the detachable 3D printing device which might have been primarily with the device itself are transferred to the robot control system.

The inventive robot-mounted 3D printing apparatus has a multiaxial jointed robot-arm which allows movement of the arm in any suitable direction. The arm can be 6-axis or a simple 3-axis range of motion. It may also be possible that the robot-arm is a flexible manipulator arm or a continuous arm. Due to the increased degree of freedom of the six-axis system, dispensing of biomaterial may be effectuated at an angle oblique to a plane of surface of a printing substrate. The multiaxial jointed robot-arm may be used universally, i.e. may be programmed and rotate as necessary. The rotation or movement of the robot-arm may be effected by actuators within the joints of the robot-arm and may be controlled by the robot-control system. The robot-arm may have sensors which may sense interactions of the arm with the environment in order avoid injuries of the patient, keep the distance to the target or to avoid damages of the robot-arm.

A typical 3- or 6-axis robot arm arrangement may provide a range of motion in each axis that allows for movement within any size range. For example, movement of the robot arm may be made with different velocities and/or with different distances or ranges. For example, a 3-axis robot arm arrangement may provide a range of motion of approximately 300 mm, such as 200 mm, in each axis. An even finer resolution embodiment may have a range of motion of less than 100 mm in each axis, such as less than 50 mm or less than 25 mm. The range of motion may even be smaller than any of the aforementioned ranges, depending on the target.

With the inventive robot-mounted 3D printing apparatus also provided is a mount attached to the end of the multiaxial jointed arm. The mount is configured to receive and hold the detachable 3D printing device. The way the 3D printing device is fixed into the mount is not limited, for example fixing may be effected via a conventional plug connection, via magnetic connection or may be fixed by screws or similar means. Interlocking or fixing between the mount and the 3D printing device may thus be made with electrical, electronic, or mechanical devices or systems. The fixing is configured in such a way that the demountable connection cannot be undone in an uncontrolled fashion. At some part of the mount a connection device is provided which allows for a connection with the device to transfer electric power to the device (such as the electric drive arrangement) to allow operating of the device via the robot-control system. The mount has further connection means that allow the transfer of the controls of the detachable 3D printing device to the robot-control system. The mount is also configured to allow loading and replacement of the reagent containers from the device. This means that the mount does not prevent opening of the upper housing component by the user.

One example of a suitable mechanism for fixing the 3D printing device may be a sliding dovetail. Sliding dovetails are assembled by sliding the tail into the socket, wherein both the mount and the 3D printing device may provide the tail or the socket. The socket may be slightly tapered, making it slightly tighter towards the rear of the joint, so that the two components can be slid together easily but the joint becomes tighter as the finished position is reached. Another method to implement a tapered sliding dovetail would be to taper the tail instead of the socket. The guide or track or socket can have any suitable form in order to facilitate the introduction of the 3D printing device into the mount. Once inserted into the guide, track or socket, a clip mechanism may fix the 3D printing device from further movement. Further interlocking elements or mechanisms may be used in the present invention. Secondary locking elements may be used to additionally fix the 3D printing device within the mount. Such secondary locking elements may be used alone or in combination with any other locking system and in one embodiment the actuation thereof is possible only if the plug parts are correctly interconnected. In one embodiment, the 3D printing device may have a locking mechanism (arm) that is adapted to latch into a corresponding latching groove provided in the mount. In such a system a secondary locking element which is moveable any may be moved to the locked or closed position after the mating process. A spring arm may be used to prevent locking the secondary locking element in case the 3D printing device is not inserted into the mount. The above list of embodiments for fixing the 3D printing device in the mount is by no means exhaustive and any system known to the skilled person may be used.

The inventive robot-mounted 3D printing apparatus can be used for extruding radiation curable reagent compositions. Therefore, the apparatus may be positioned at suitable position on or next to the site of operation. Embodiments of the 3D printing apparatus have a number of surgical and research uses. For example the device can be used for repairing defects of an mammalian body. Such defect may be, but not limit to, tissue defects or bone defects. In one embodiment, the repair relates to biological materials which are unable to self-repair such as cartilage or corneal tissue. In such applications the apparatus can be used to directly write 3D living cells onto the damaged area for tissue or bone regeneration. For example cartilage is unable to self-repair and can become damaged through physical activities, wear, trauma or degenerative conditions. The apparatus loaded with appropriate stem cells can be used to perform in-situ repair, and current surgical interventions are of limited effectiveness. It is also possible to use the apparatus for cell types capable of repair, such as skin or bones. In such cases the apparatus could be used to directly print or write living cells onto damaged tissue to assist with the repair process. For example bone stem cells and bone growth factors could be printed on fractures or in other bone surgery such as spinal fusions to stimulate bone growth. Similarly keratinocytes and other skin cells could be directly printed onto cuts, abrasions or burns to stimulate skin repair and minimise scar tissue formation.

BRIEF DESCRIPTION OF THE DRAWINGS

Embodiments of the present disclosure will be discussed by way of example with reference to the accompanying drawings wherein:

1A is an isometric view of a handheld 3D printing apparatus according to an embodiment;

FIG. 2A is an isometric view of a nozzle of a handheld 3D printing apparatus according to an embodiment;

FIG. 2B is an top view of the handheld 3D printing apparatus of FIG. 2A;

FIG. 2C is side view of the handheld 3D printing apparatus of FIG. 2A;

FIG. 2D is an end view of the handheld 3D printing apparatus of FIG. 2A;

FIG. 4A is an isometric view of a two part extruder tip according to an embodiment;

FIG. 4B is an exploded view of the two part extruder tip of FIG. 4A;

FIG. 4C is an isometric view of the tip cap of the two part extruder tip of FIG. 4A;

FIG. 4D is a side view of the two part extruder tip of FIG. 4A;

FIG. 4E is a front view of the two part extruder tip of FIG. 4A;

FIG. 4F is a sectional view along section HH of FIG. 4E;

FIG. 5A shows a first isometric view of an embodiment with a rear hinge;

FIG. 5B shows a second isometric view the embodiment shown in FIG. 5A

FIG. 5D is a top view of the embodiment shown in FIG. 5A with the upper housing removed;

FIG. 5E is a side view of the embodiment shown in FIG. 5A;

FIG. 5F is a bottom view of the embodiment shown in FIG. 5A;

FIG. 5G is a front view of the embodiment shown in FIG. 5A;

FIG. 5H is a sectional view through section SS of FIG. 5D;

FIG. 5I is a side view of the embodiment shown in FIG. 5A with the top cover open;

FIG. 6A is a side view of the nozzle assembly in the embodiment shown in FIG. 5A;

FIG. 6B is another side view of the nozzle assembly in the embodiment shown in FIG. 5A;

FIG. 6C is an end view of the nozzle assembly in the embodiment shown in FIG. 5A;

FIG. 6D is an isometric view of the nozzle assembly in the embodiment shown in FIG. 5A;

In the following description, like reference characters designate like or corresponding parts throughout the figures.

DETAILED DESCRIPTION

First, the detachable 3D printing device is described in a general embodiment. The detachable 3D printing device has a nozzle connected at a distal end to the housing and comprising a co-extrusion tip comprising at least one aperture, and a first conduit for receiving the first reagent driven out of a proximal end of the first reagent container and directing the first reagent out of the at least one aperture in the tip, and a second conduit for receiving the second reagent driven out of a proximal end of the second reagent container and directing the second reagent out of the at least one aperture in the tip. This means, that the two reagents are contacted, for example mixed, prior to being extruded from the nozzle tip.

Figure 1A:
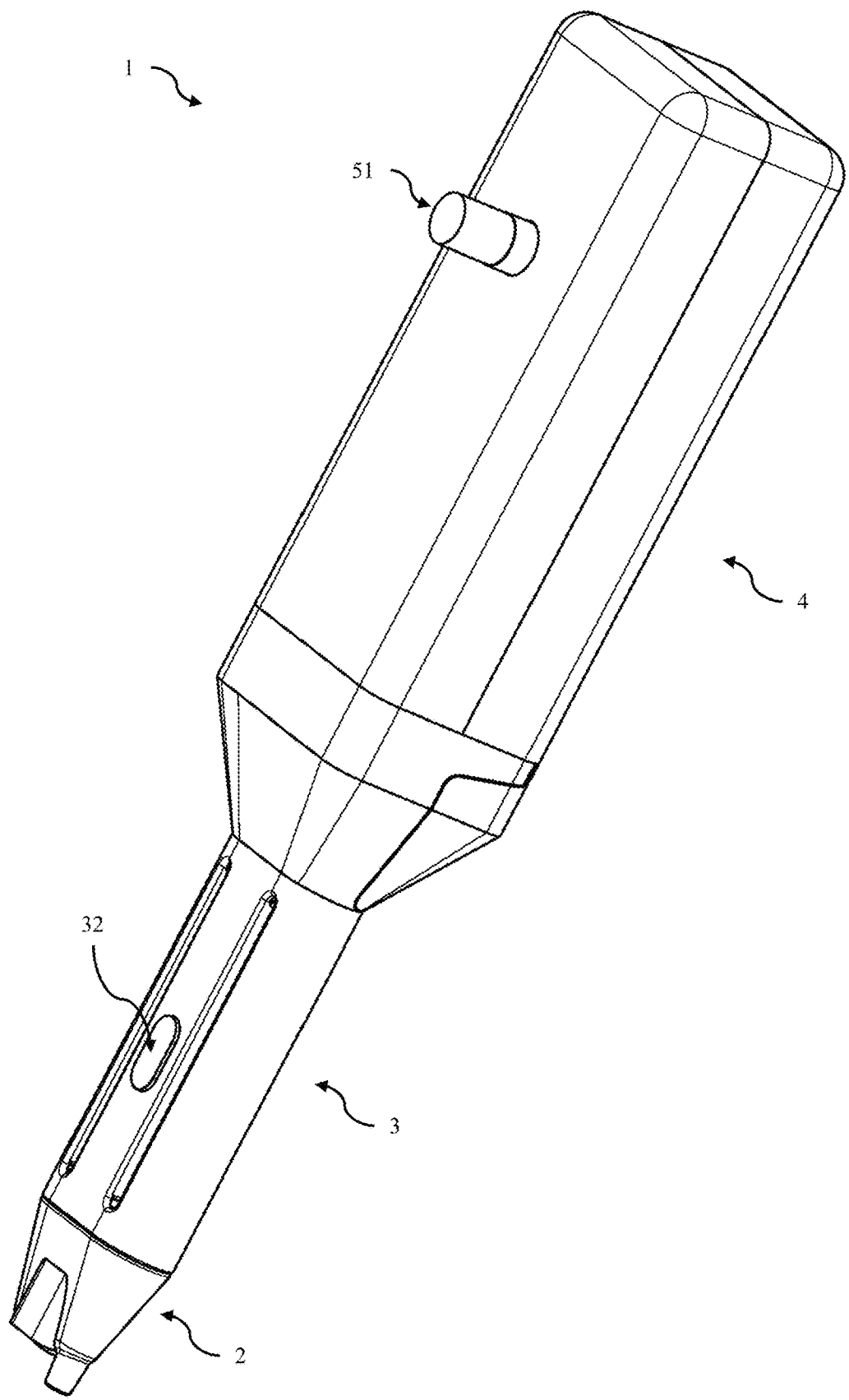
FIG. 1B is an exploded isometric view of the handheld 3D printing apparatus of FIG. 1A.
FIG. 1C is an exploded top view of the handheld 3D printing apparatus of FIG. 1A.
FIG. 1D is an exploded side view of the handheld 3D printing apparatus of FIG. 1A.
FIG. 1E is an exploded end view of the handheld 3D printing apparatus of FIG. 1A.

In one embodiment, the detachable 3D printing device has a nozzle comprising a core aperture and an annular aperture in a coaxial arrangement, and a first conduit for receiving the first reagent driven out of a proximal end of the first reagent container and directing the first reagent out of the core aperture in the tip, and a second conduit for receiving the second reagent driven out of a proximal end of the second reagent container (9) and directing the second reagent out of the annular aperture in the tip. Referring to FIG. 1A, there is shown an embodiment of a detachable 3D printing device for extruding and curing radiation curable reagent compositions which will be referred to as a biopen. The detachable 3D printing device 1 or biopen comprises a nozzle 2 and a housing. The nozzle defines the proximal end and the housing defines the distal end. In the embodiment shown in FIG. 1A, the housing is formed from a handgrip 3 and a rear housing 4.

Figure 1B:
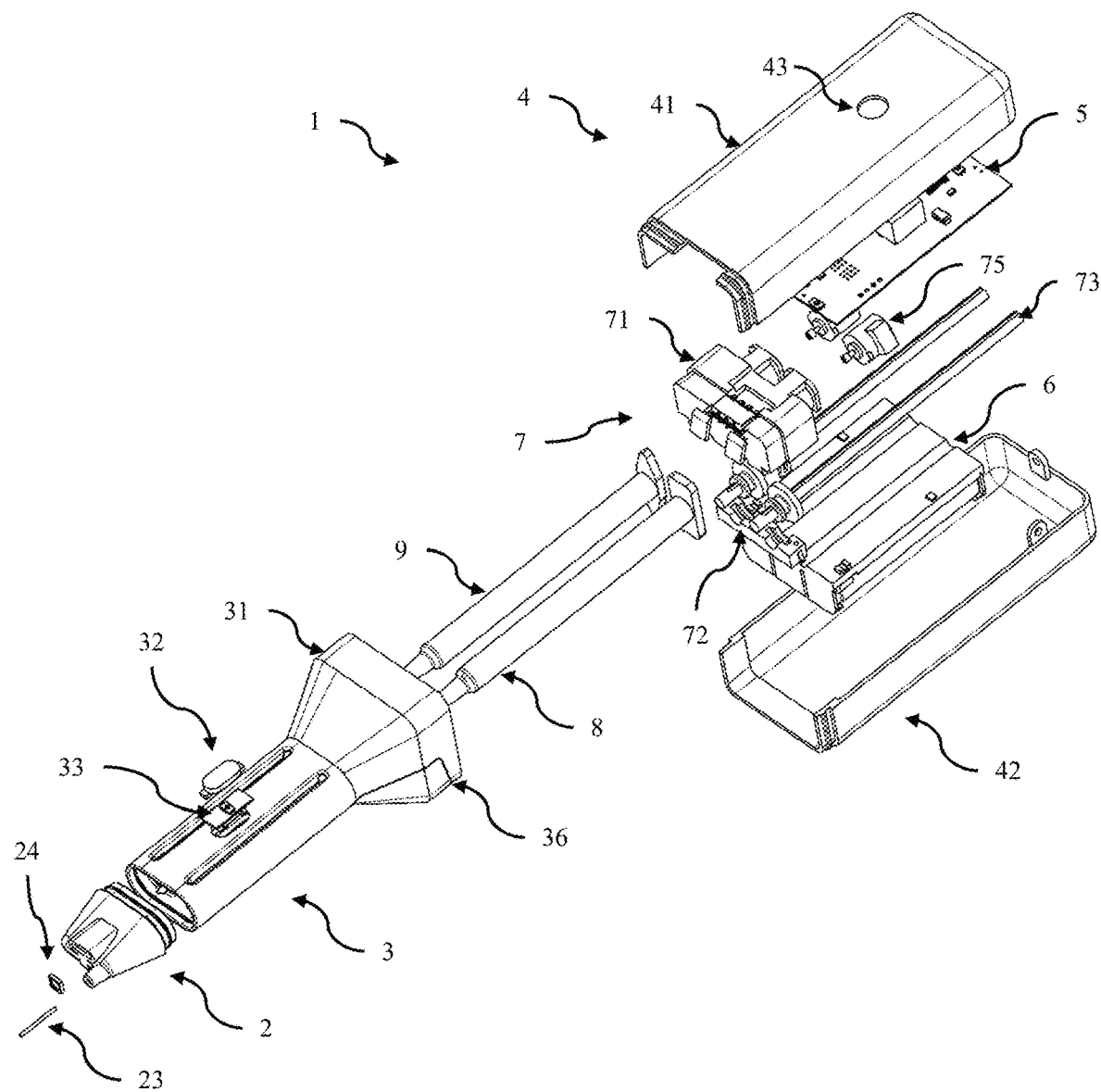
Figure 1C:
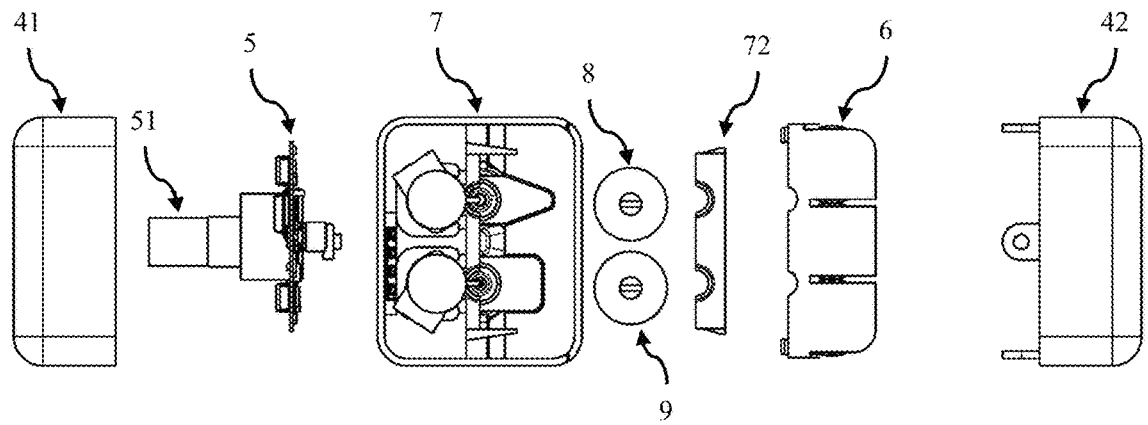

FIG. 1B is an exploded isometric view of the detachable 3D printing device of FIG. 1A, and FIGS. 1C, 1D and 1E are exploded top, side and end views. As will be explained in more detail below, the detachable 3D printing device or biopen comprises a first reagent container support arrangement which in use receives and supports a first reagent container 8 containing a first stem cell supporting reagent. The detachable 3D printing device or biopen also comprises a second reagent container support arrangement 35 (cf. FIG. 3A), which in use receives and supports a second reagent container 9 containing a light curable reagent. In this embodiment the apparatus is approximately 175 mm in length and the rear housing is approximately square with 30 mm sides, and weight is less than 100 grams.

The rear housing 4 comes in a an upper section 41 and a lower section 42 and houses a power supply 6, such as alkaline, lithium ion or other batteries (e.g. 3 AAA alkaline batteries or any other number of batteries), an electric drive train arrangement 7 which is configured to drive a first reagent piston 84 into a distal end 81 of the first reagent container 8, and to drive a second reagent piston 94 into a distal end 91 of the second reagent container 9. An electronic control circuit 5 is used to control the electric drive train 7 to control extrusion of the reagents from the first and second reagent containers 8 and 9. The upper hosing 41 in this embodiment is removable to allow replacement of the reagent containers when the device is fixed to the mount.

In addition to be mounted to the multiaxial jointed robot-arm, the device may be also used as a handheld. In this case, power is provided by the batteries within the device. However, once the device is fixed in the mount of the apparatus, power is supplied via the robot-control systems and transferred through respective connections in the mount and the device. This holds true for all embodiments of the invention.

An embodiment of the nozzle 2 is shown in FIGS. 2A to 2H. FIGS. 2A, 2B, 2C and 2D are isometric top, side and end views respectively. The nozzle 2 comprises a manifold housing 21 with the distal end comprising a retention rib to allow connection of the nozzle to the distal end to the housing 3. At the proximal end the nozzle comprises a co-extrusion tip 22 with a core aperture 23 and an annular aperture 25 in a coaxial arrangement. In this embodiment, a light source 24 is mounted on or in the nozzle for curing the reagents either just prior or after extrusion from the tip 22. In the embodiment shown in FIGS. 2A to 2D and 2G the light source 24 is a UV LED mounted on the proximal end of the nozzle to irradiate the reagents after they are extruded from the tip. A conduit 222 is provided for the LED cable. In this embodiment the LED 24 is located on the lower side of the nozzle (i.e. opposite side to on/off button 33) and the conduit 222 is provided on the upper side. This ensures that UV light is directed downward and that the conduit 222 and nozzle 2 partially shields or blocks emission back towards the user. In other embodiments, further guards may be used to minimise or control the direction of emission to reduce unwanted exposure to the patient or operator. The UV light source may generate radiation in the wavelength from 100-420 nm, such as 200-420 nm or 300-420 nm. In one embodiment the wavelength is 350-420 nm. The light source could be a UV LED or UV laser diode, along with focusing optics (lenses, etc) and guards or shields to block and control the emission direction. In other embodiments the device could be used with different materials with different curing wavelengths (not necessarily UV wavelengths), in which case the light source would be selected to match the curing wavelength. As explained above, in other embodiments the light source could be omitted from the apparatus, and extruded material can be cured using a separate remote or external light source and external light guides. Such external light source may be selected from the group of light sources mentioned above.

The nozzle 2 comprises a manifold housing 21 which comprises a first conduit that receives the first reagent driven out of the proximal end of the first reagent container 8 and directs the first reagent out of the core aperture 23 in the tip 22. A second conduit 26 receives the second reagent driven out of a proximal end of the second reagent container 9 and directs the second reagent out of the annular aperture 25 in the tip 22. The reagents are thus extruded as a coaxial bead of material with the first reagent forming the core material and the second reagent forming a shell material which surrounds, protects and supports the core material. The first or core reagent material may comprise stem cells and support media in a hydrogel or paste. The second or shell reagent material will typically have a different composition in line with providing a protecting and structural support role for the core material, and may or may-not comprise stem cells. The second reagent material may be provided as a hydrogel or paste. The hydrogels may be comprised of a hyaluronic acid, methacrylic anhydride, agarose, methylcellulose, gelatine or the like.

Figure 2E:
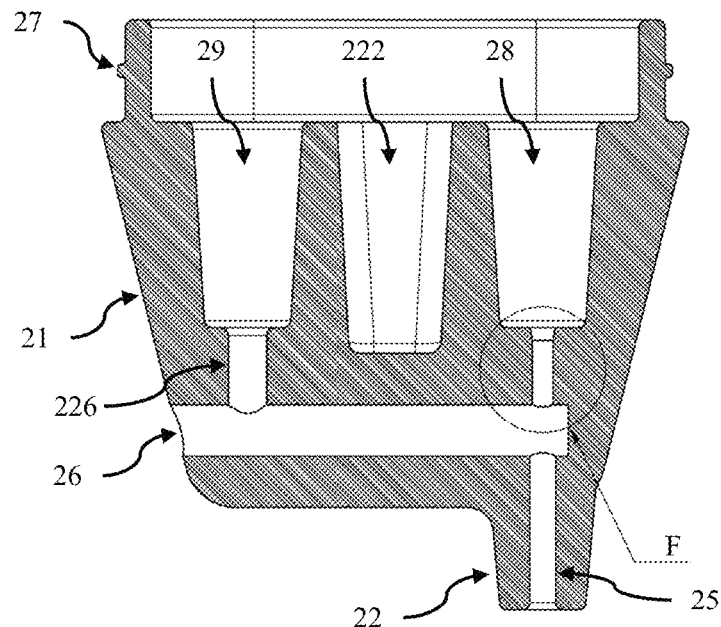
FIG. 2E is a sectional view through section AA of FIG. 2C prior to insertion of the core tube.
Figure 2F:
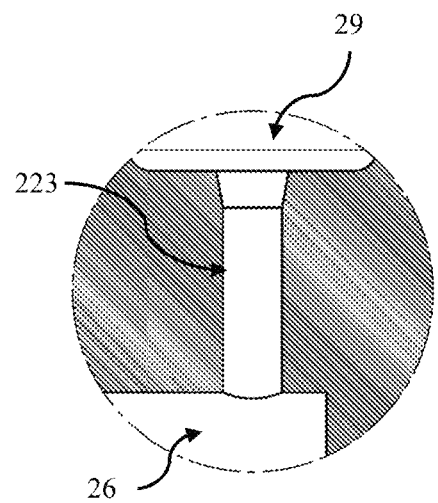
FIG. 2F is a sectional detail view through feature F of FIG. 2E.
Figure 2G:
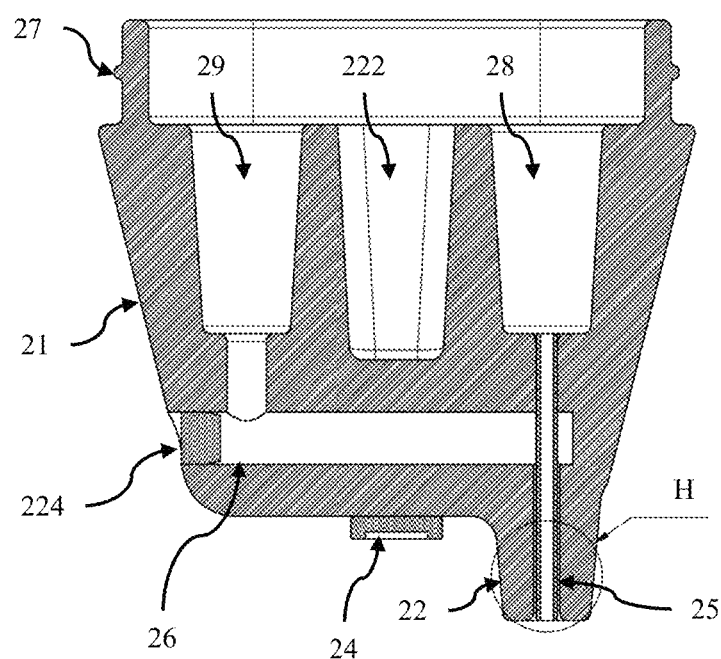
FIG. 2G is a another sectional view through section AA of FIG. 2C in final form after sealing and insertion of the core tube.
Figure 2H:
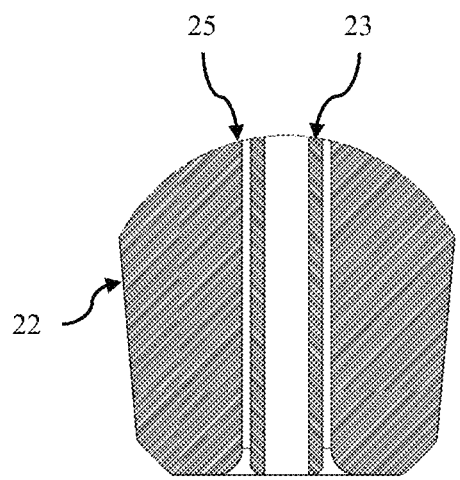
FIG. 2H is a sectional detail view through feature H of FIG. 2G.

The nozzle in this embodiment is suitable for manufacture using plastic injection moulding and the internal structure of an embodiment of the nozzle is shown in more detail in FIGS. 2E to 2H. FIG. 2E is a sectional view through section AA of FIG. 2C of the nozzle after moulding and prior to insertion of the a core tube 23 and manifold plug 224, and FIG. 2G is another sectional view through section AA of FIG. 2C in the final form after insertion of the core tube and manifold plug. The configuration of the coaxial tip 22 is further illustrated in FIG. 2F which is a sectional view through feature F of FIG. 2E and FIG. 2H which is a sectional view through feature H of FIG. 2G.

As shown in the embodiment of FIG. 2E, the manifold housing 21 comprises a first cavity 28 for receiving the proximal end 83 of the first or core reagent container 8, and a second cavity 29 for receiving the proximal end 93 of the second or shell reagent container 9. A first conduit 223, shown in more detail in FIG. 2F extends from the first cavity 28 to the manifold 26 and a second conduit 226 extends from the second cavity 29 to the manifold 26. A first or shield tube 25 extends from the manifold 26 to the tip 22, and is a larger diameter than the first conduit 223. As can be seen in FIGS. 2E and 2G the manifold 26 is initially open to the outer wall of the manifold housing 21 (to allow moulding of the interior of the nozzle) and thus a manifold plug 224 is provided to seal the manifold 26. The co-axial co-extrusion tip 22 is formed by inserting a core tube (or hollow hypodermic needle like tube) 23 into the first or shield tube 25 and through the manifold 26 into the first cavity 28 via the first conduit 223. The first conduit 223 is dimensioned to have a diameter similar to the external diameter of the core tube 23 to ensure a snug and secure fit to prevent leakage of the first reagent into conduit 26. FIG. 2F shows the nozzle 22 after insertion of the core tube 23. In use the first or core reagent is located within and extruded from core tube 23, and the second or shell reagent flows in the annular gap between the outer surface of the core tube 23 and inner wall of the first tube 25. The first conduit 223 acts to locate and centre the core tube 23 within the first tube 25 to ensure co-axial extrusion.

In this embodiment the light source 24 is a UV LED mounted externally on the nozzle to cure the reagents after extrusion from the tip. As shown in FIGS. 2E and 2G a conduit 222 is provided for cables supplying power to the LED. In another embodiment a UV light source may be located internally within the manifold 26 in order to irradiate the second (shield) reagent whilst in manifold 26 just prior to extrusion from the tip. In this embodiment the manifold plug 224 is replaced with an LED inserted through the opening the manifold plug 224 is normally located in. This approach limits or prevents radiation exposure to the user or patient as UV light/radiation is confined to be substantially internal to the nozzle 2 with only minimal light leakage out of the tip 22.

Figure 3B:
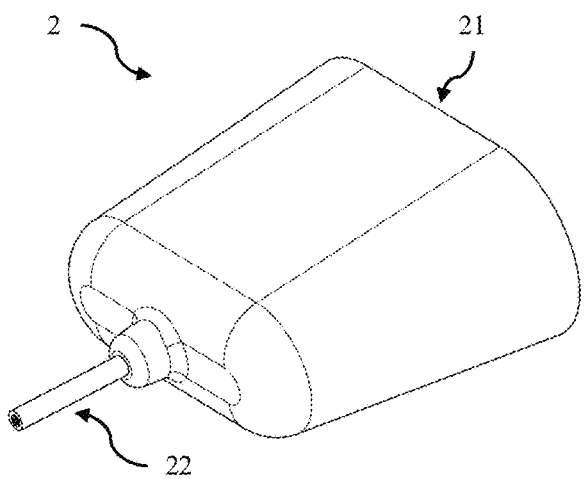
FIG. 3B is an isometric view of a nozzle of a handheld 3D printing apparatus according to another embodiment.
Figure 3E:
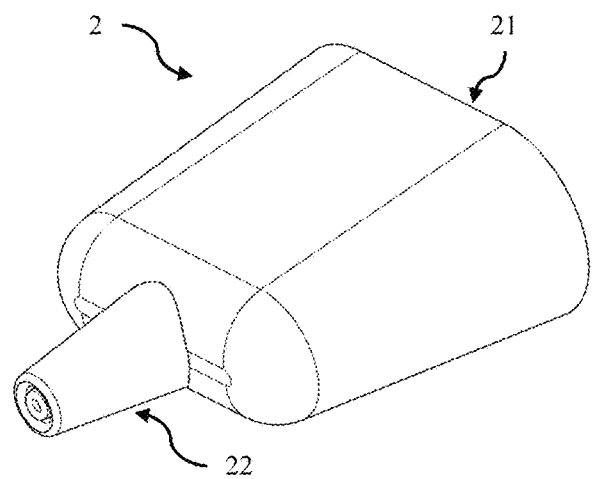
FIG. 3E is an isometric view of a nozzle of a handheld 3D printing apparatus according to another embodiment.
Figure 3C:
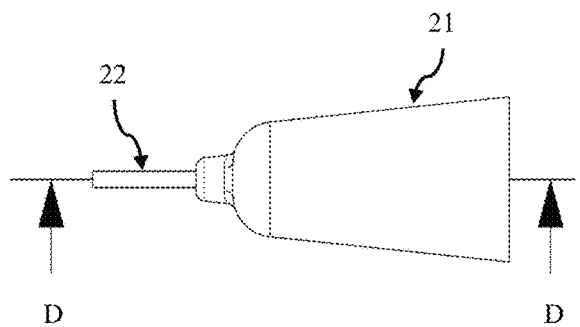
FIG. 3C is an end view of the nozzle of FIG. 3B.
Figure 3F:
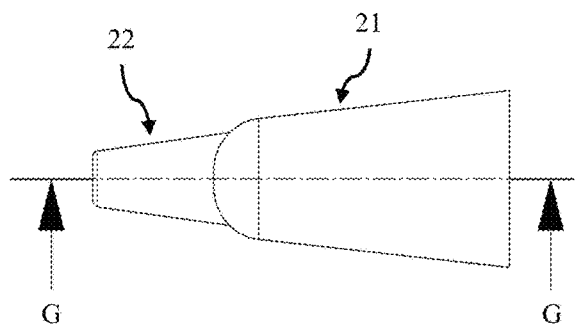
FIG. 3F is an end view of the nozzle of FIG. 3B.
Figure 3D:
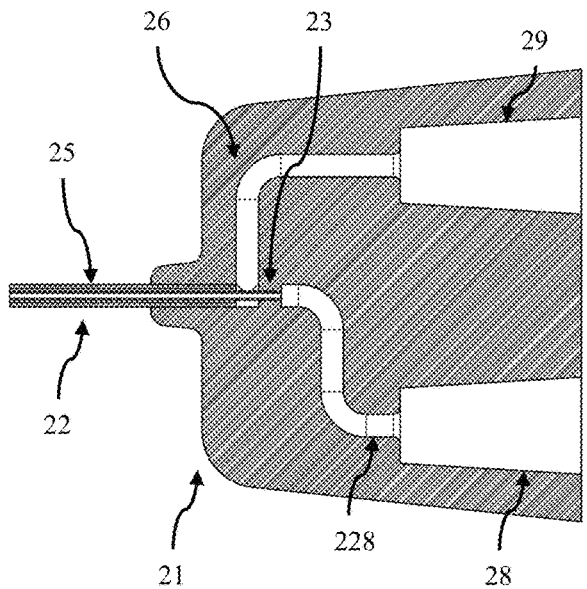
FIG. 3D is a sectional view through section DD of FIG. 3C.

Further embodiments of the nozzle 2 are illustrated in FIGS. 3B to 3G, and 4A to 4F. A nozzle of a detachable 3D printing device, according to another embodiment, includes a light pipe that extends from an internal light source (e.g. UV LED) located within the nozzle 2. This allows the light to be directed onto the reagents as they are extruded from the tip 22. FIGS. 3B to 3D show an isometric, end view and sectional view (through section DD of FIG. 3C) of another embodiment of a nozzle 2 with the extrusion tip formed from two coaxial hypodermic needle like tubes. In this embodiment the nozzle housing 21 is formed without the co-extrusion tip 22 using plastic injection moulding. The co-extrusion tip 22 is formed by first inserting the shell tube 25 into a tubular aperture formed in the proximal end of the nozzle until it reaches the manifold 26, and then inserting the core tube 23 inside the shell tube 25 until it engaged with the first conduit 228. Alternatively the order of insertion could be reversed, or the core tube 23 could be first inserted inside the shell tube 25, and the co-axial tubes inserted into the proximal end of the nozzle housing 21.

Figure 3G:
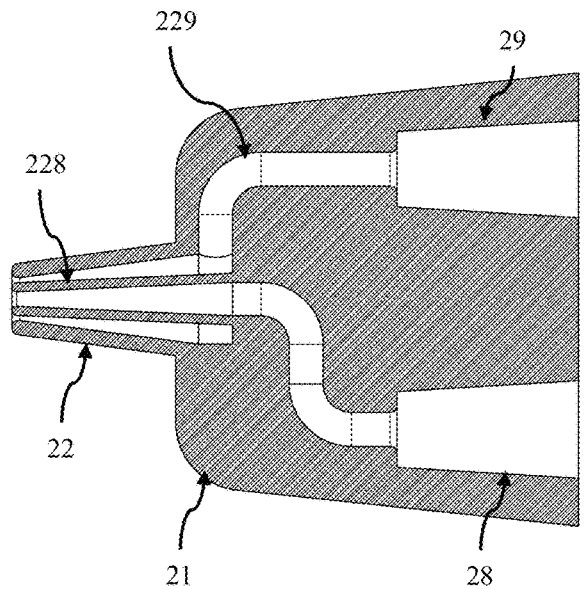
FIG. 3G is a sectional view through section GG of FIG. 3F.

FIGS. 3E to 3G show an isometric, end view and sectional view (through section GG of FIG. 3F) of another embodiment of a nozzle 2 with a directly formed coaxial co-extrusion tip 22. That is unlike the previous embodiments there is no requirement to insert a core tube 23 into a formed shell tube 25 to form the tip 22. In this embodiment the first conduit 228 leads directly to the tip 22—that is the proximal end of the first conduit 228 forms the core tube 23. Similarly the second conduit 229 leads directly to the tip 22 and is formed such that it co-axially surround the core tube 23 (228). This co-extrusion tip is more challenging to make using injection moulding but could alternatively be 3D printed.

FIGS. 4A to 4F illustrate an embodiment of a two part extruder tip. FIG. 4A is an isometric view, FIG. 4B is an exploded view, FIG. 4C is an isometric view of the tip cap 271, FIG. 4D is a side view, FIG. 4E is a front view and FIG. 4F is a sectional view of section HH of FIG. 4E. In this embodiment the two part extruder tip comprises a tip cap 271 and a tip rear 272 which can be clipped together. The tip rear 272 comprises a seal recess 276 which received a seal 274. A light pipe 225 from the circuit board 5 passes through a rear aperture 277 in the tip rear, and forward aperture 275 in the tip cap 271, so that the tip of the light pipe 242 can be directed onto extruded material from the tip 22. Internally a hypodermic tube 23 is inserted into hypodermic support structure 278 extending forward of the tip rear 272 and into chamber 28. The tip cap 271 comprises a channel 229 for receiving shell reagent from cavity 29 and the channel leads to a forward cavity 273 which also receiving the hypodermic support structure 278 and hypodermic tube. Clearance is provided around the hypodermic tube 23 to allow the shell reagent to flow out of the tip with stem cell reagent.

Figure 5C:
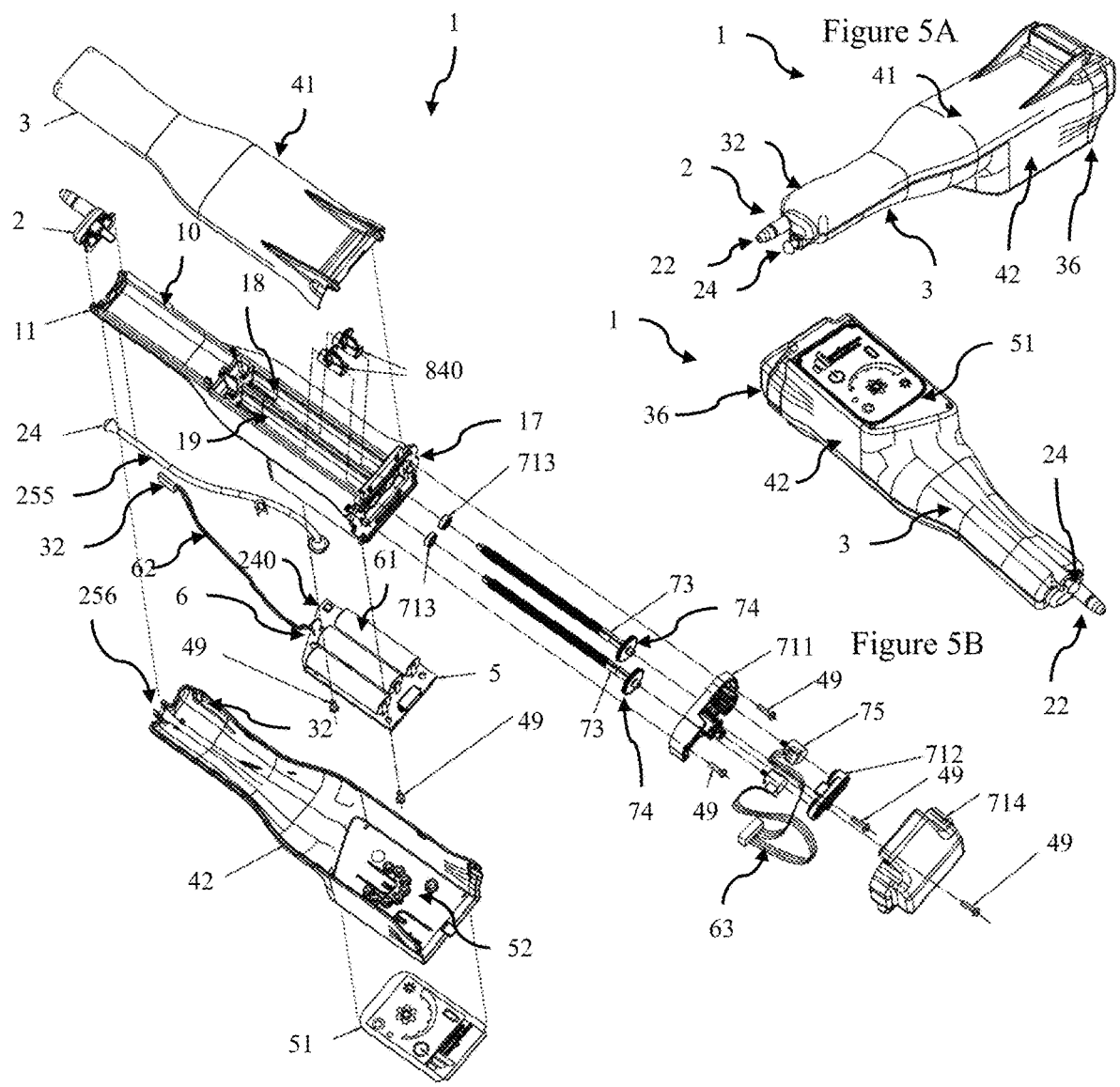
FIG. 5C is an exploded view of the embodiment shown in FIG. 5A.
Figure 5K:
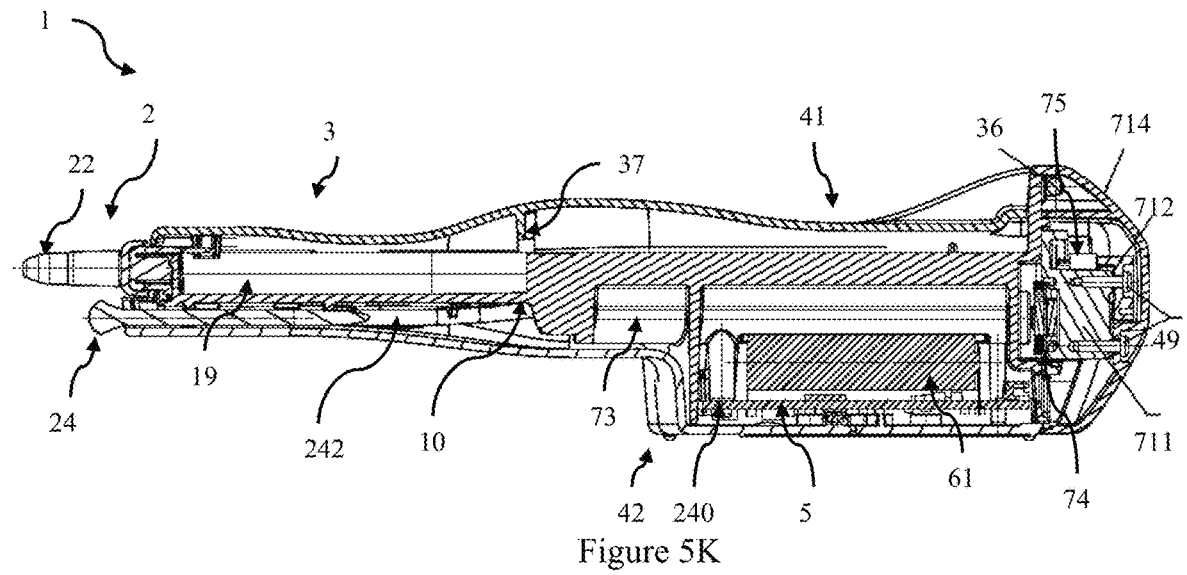
FIG. 5K is a sectional view through section YY of FIG. 5D.
Figure 5L:
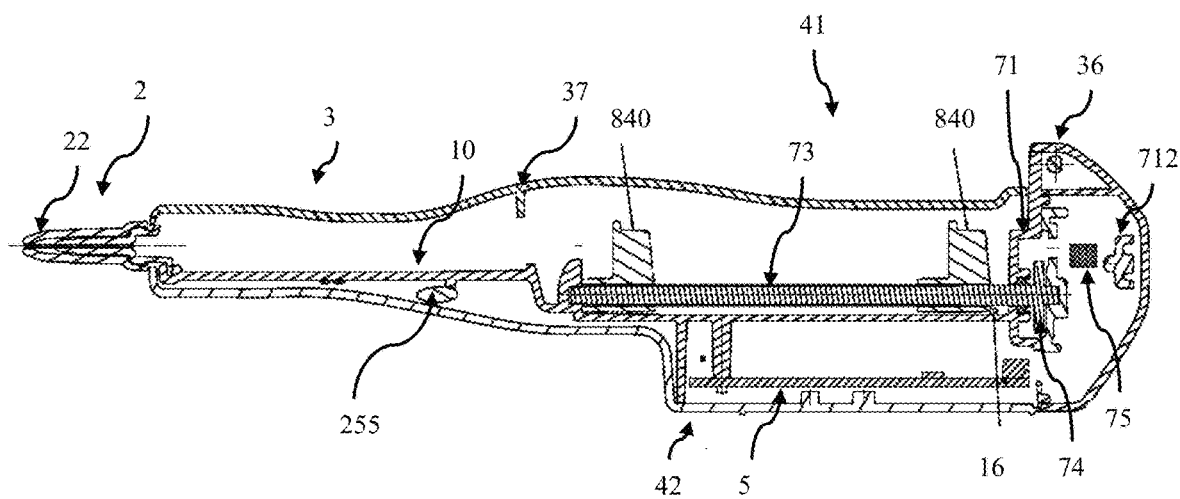
FIG. 5L is a sectional view through section ZZ of FIG. 5D.

FIGS. 5A to 5L show another embodiment of a biopen apparatus 1 with a rear hinge allowing top loading of syringes. FIGS. 5A and 5B show isometric views and 5E, 5F and 5G show side, bottom and front views of the biopen apparatus, and Figure 5I shows a side view with the top cover open and flipped back. FIG. 5D is a top view with the upper housing (top cover) 41 removed. FIGS. 5H, 5K and 5L are sectional views through sections SS, YY and ZZ of FIG. 5D respectively.

As can be seen in these embodiments, the apparatus comprises a frame 10 which in turn supports the nozzle assembly 2, reagent containers 8 and 9 (not shown) in cavities 18, 19, drive assembly 7, control module 5 and power supply 6. The housing surrounds the frame and comprises an upper housing 41, a lower housing 42, and a rear motor cover 714. In this context relative locations such as upper, lower, forward or proximal, and rear or distal are referenced with respect to the nozzle tip when inserted into the mount of the apparatus. The upper housing 41 has a cradle shape and comprises clips on the inside surfaces to allow the housing 10 to be clipped into the lower housing 42. The nozzle assembly 2 projects forward of the proximal (or forward) ends of the upper housing and lower housings 41 and 42. The lower housing 42 is connected to the rear motor cover 714 using a hinge 36 that allows the upper housing 41 to hinge upwards and rearward. In this embodiment hinging through an opening angle of up to a point where the upper end of the upper housing 41 is the same level of the lower housing 42 is possible. The opening should be at least 90° in order to allow for an easy replacement of the reagent containers. On one embodiment the upper housing may flip through 90° to 270°. For example, the opening angle may be 90°, 100°, 110°, 120°, 130°, 140°, 150°, 160°, 170°, 180°, 190°, 200°, 210°, 220°, 230°, 240°, 250°, 260° or 270° or any other angle. A latch 37 is formed on the inside upper surface of the lower housing 42 which engages with the inside of the upper housing to retain the upper housing in a closed position. In other embodiments the hinge is located in a rear portion of the housing to allow the upper housing component 41 to flip through at least 90° to provide internal access to allow loading of reagent containers. In some embodiments non-biocompatible materials and components are separated from the operating environment by mechanically sealed enclosures. In some embodiments the upper housing 41 (or an upper portion of the housing) is transparent to allow viewing of the reagent containers and actuators. In some embodiment the frame 10 and upper housing 41 (or an upper portion of the housing) are embossed with lettering to locate the reagents in the correct position.

The housing is moulded so that the biopen apparatus can be comfortably fixed in the mount of the apparatus and also to be held by a user's hand in case the device may not be fixed to the mount with the upper housing 41 comprising a bump near the palm and a depression near the fingertip region of the handgrip portion 3.

The drive assembly comprises two jack screw (shafts) that pass through apertures in the rear wall 17 of the frame 10 and end in jack spur gears 74 which is held in place by a retainer 712, which is mounted to the frame 10 and rear motor cover 714 via screws 49. The retainer 712 also supports the stepper motors 79. Plunger actuators 840 are mounted on the jack screw such that rotation of the jack screw moves the plunger actuators 840 forward (or rearward) to drive the plungers of the syringes (located in the forward or handgrip portion) to extrude material.

In this embodiment the device may be powered by via the robot control system but may also optionally have a power supply comprising three 1.5V AAA type batteries which are located in a battery compartment on the underside of the frame 10, and above the PCB circuit board on which is mounted control electronics including a microprocessor and power circuits to respond to user interface signals and to control the operation of the apparatus. Wires 63 run from the PCB on the underside of the frame 10 to the start/stop button 32, and wires 65 run from the PCB to the stepper motors 75 to control extrusion. A UV LED 240 is mounted on the top surface of the PCB, and a light pipe 242 directs the UV light to the tip of the nozzle 2 to provide a UV light source 24 to cure extruded material.

In other embodiments the biopen could sterilisable, in particular the disposable parts and sterilisable parts. In one embodiment the nozzle 2 can be sterilised using radiation or an autoclave, and the rear housing containing the electronics and mechanical components is sterilised using an alcohol swab or bath (70-85% ethanol). Additionally the reagents can be loaded and reloaded during use (whilst maintaining sterility).

Figure 6E:
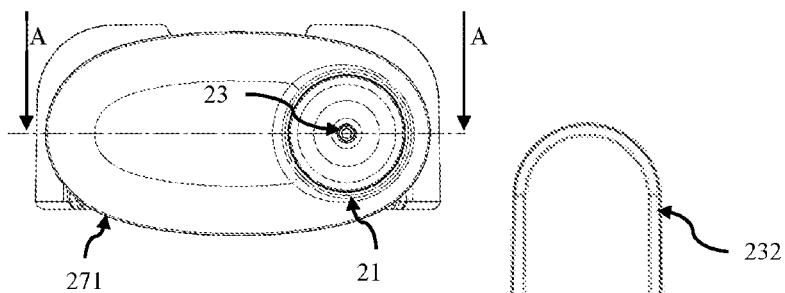
FIG. 6E is a top view of the nozzle assembly in the embodiment shown in FIG. 5A.
Figure 6F:
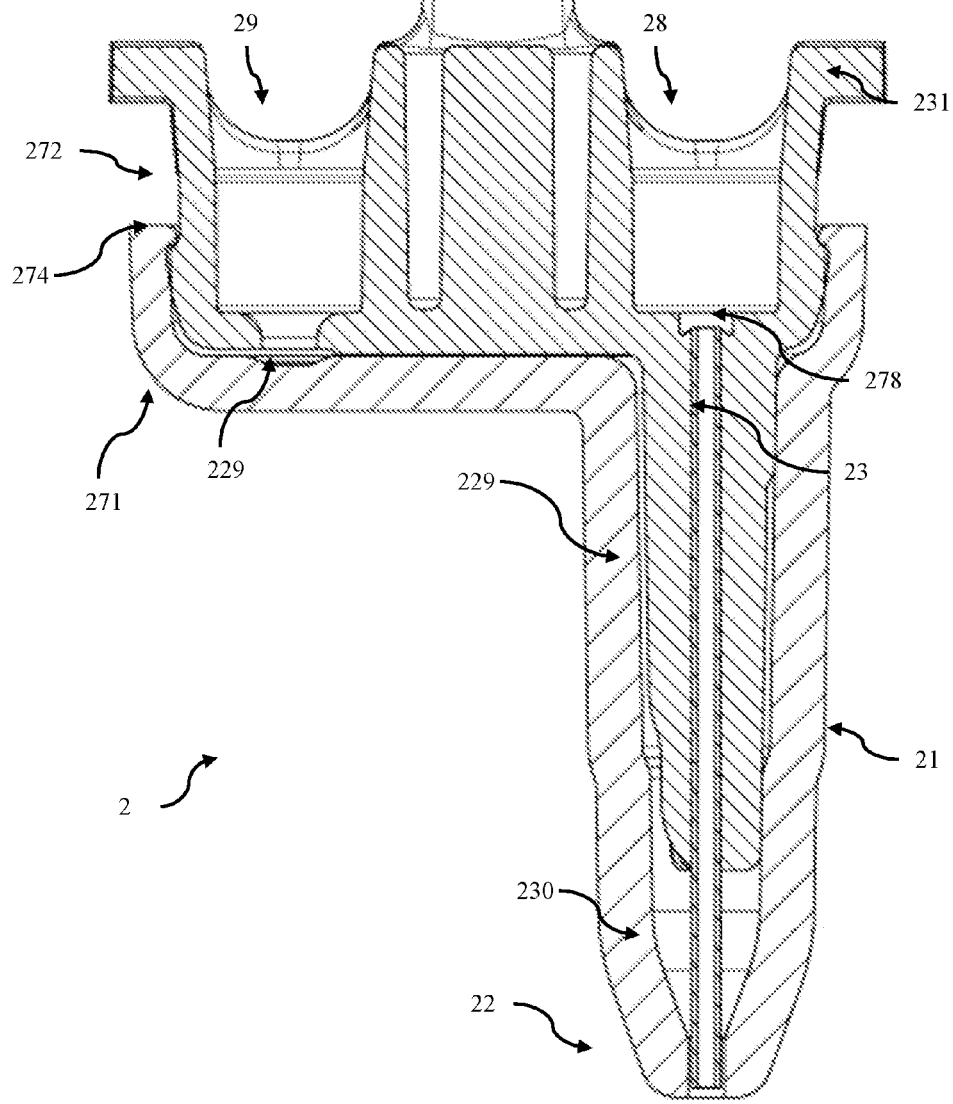
FIG. 6F is an section view of the nozzle assembly through section AA of FIG. 5E.

FIGS. 6A to 6F show various views of the nozzle assembly 2 of another embodiment. FIGS. 6A, 6B, 6C, 6D, and 6E show two side, top, end, isometric and top views, and FIG. 6F is a section view of the nozzle assembly through section AA of FIG. 6E. In this embodiment the nozzle assembly 2 is formed of a cap portion 271 and nozzle portion 272.

Both the cap portion 271 and nozzle portion 272 are designed to be formed using injection molding processes with the ability to control tolerances to a high level. The cap 271 is moulded and stripped from the undercut in the tool while still hot permitting a peripheral clip retention feature 274 to be formed. The nozzle portion 272 is moulded over the hypodermic tube 23 in a single operation. Specialised tooling is required for holding the tube in place during moulding. The nozzle portion 272 forms the mechanical interface with the frame 10 and seals to the syringes via a Luer slip interface.

The cap portion 271 is a clip/interference fit on the nozzle portion 272 forming a fluid tight seal once pressed into position negating the need for any additional sealing method. The cap portion 271 also forms a fluid manifold 229 guiding the shell material from the syringe to a concentric ring 230 around the hypodermic tube 23 thus forming a coaxial extrusion. In other embodiments the nozzle assembly is sealed with an o-ring and fastened with one or more screws.

The nozzle assembly (2) is removable from and attachable to the housing. This allows to attach different types of nozzle assemblies (2) to the biopen depending on the application for which the biopen should be used. For example, by replacing the nozzle assembly (2) it is possible to have differing blend system, such as the first reagent being extruded throughout a core aperture (23) and the second reagent being extruded through an annular aperture (25), whereas by replacing the nozzle assembly (2) the first reagent may be extruded throughout an annular aperture (25) and the second reagent may be extruded through an a core aperture (23). The possibility of replacing the nozzle assembly may also allow to replace defect or clogged nozzles assemblies.

The nozzle assembly 2 is an example of a separate assembly to the frame 10 to permit changing of the nozzle assembly if damaged, or at a device level, refinement of the nozzle assembly design for alternate applications. Alternate configurations may include side by side extrusion, different geometric shapes, different length nozzles, different diameter nozzles, different geometric ratios etc. The rear of the nozzle portion 272 comprises a rear shoulder, which as shown in FIG. 5L creates cavity with the distal end of the cap portion 271 within which is received the proximal ends of the upper and lower housings 41 and 42, and the proximal end of the frame 10 to secure the nozzle assembly 2 in place. A flat rearwardly extending projection 234 located on the upper side of the nozzle portion 272 acts as a retaining surface for a clip formed on the underside of upper housing 41.

Figure 7:
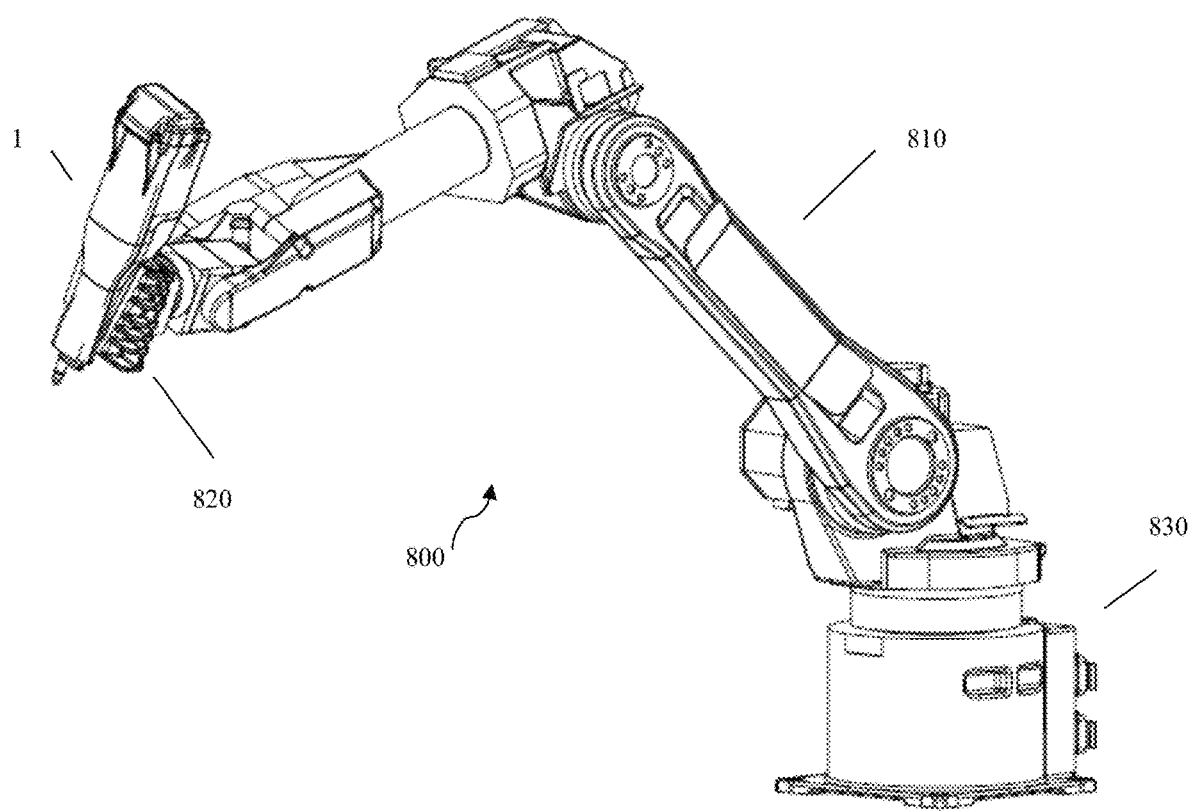
FIG. 7 is a perspective view of a robot-mounted 3D printing apparatus of the invention.

FIG. 7 shows an example of the inventive robot-mounted 3D printing apparatus (1). In this embodiment a 6-axis robot arm can be seen which is mounted on a foot which keeps the apparatus in position. At the end of the multiaxial jointed arm the mount is attached, wherein a detachable 3D printing device according to the invention is fixed. The mount is rotatable by 360° so that every necessary position of the device can be achieved and extrusion is facilitated.

Figure 8:
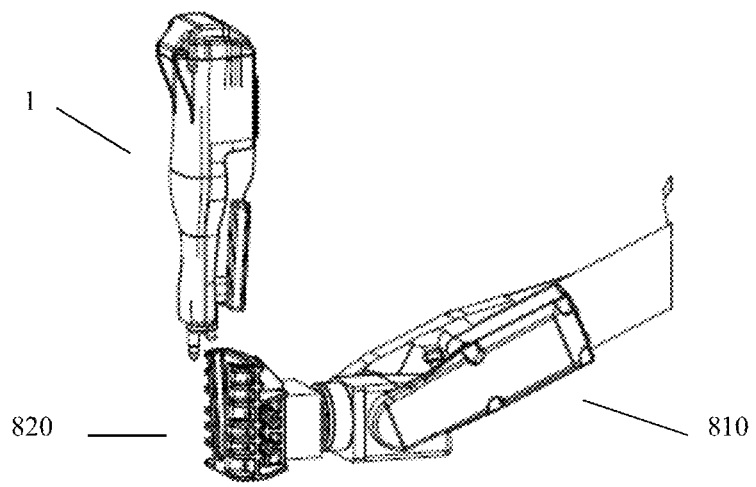
FIG. 8 is a perspective view of the mount of the robot-mounted 3D printing apparatus showing the easiness of removing the detachable 3D printing device.

FIG. 8 shows the mount of the robot-mounted 3D printing apparatus which is configured to receive the detachable 3D printing device. The device perfectly fits into the mount so that it is fixed and can withstand any movement or rotation of the robot arm. Once the device is fixed in the mount the controls of the device are transferred to the robot-control system via suitable connection ports. The device is easily removable, for example to be replaced by another device or for cleanability and/or sterilisation considerations.

Figure 9:
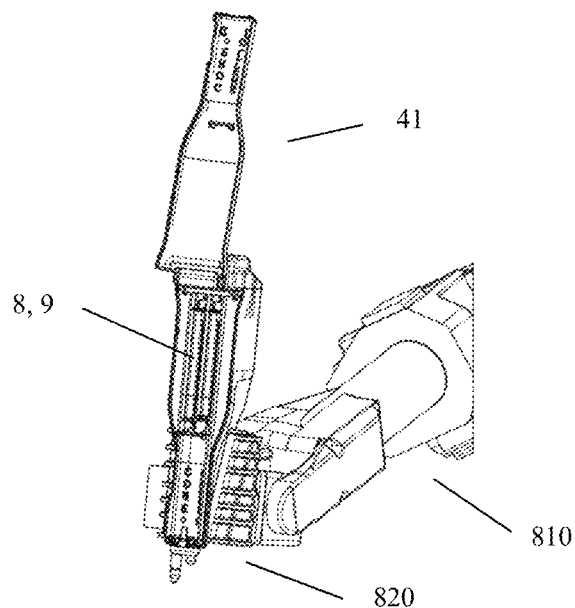
FIG. 9 is a perspective view of the mounted detachable 3D printing device with the open upper housing component.

FIG. 9 shows one embodiment how the reagent containers 8, 9 may be replaced. The upper housing 41 is opened and flipped through the hinge through about 190°. The reagent containers can be easily replaced.

Figure 10:
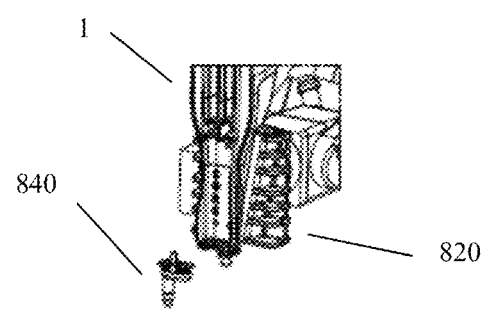
FIG. 10 is a perspective view showing the easiness of replacing the nozzle.

FIG. 10 shows that the nozzle of the device can be easily replaced, for example in case the nozzle is dirty or clogged. By replacing the nozzle the respective nozzle configuration can be changed without impacting other parts of the system.

Embodiments of the robot-mounted 3D printing apparatus have a number of advantages. First the apparatus is suitable for cost effective production using high volume manufacturing techniques and processes. The nozzle has been carefully designed to ensure consistent flow of materials whilst also being suitable for cheap and easy construction and it is easy to replace the nozzle even in case the detachable 3D printing device is fixed to the mount of the apparatus. The apparatus gives the user greater freedom of movement and ease of use. The apparatus is designed to allow easy and fool-proof reagent loading through opening of the device with different shaped loading bays to ensure that each reagent is loaded (and can only be loaded) into the correct bay and at any time during the extrusion and/or curing process.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims. Thus, it will be appreciated that there may be other variations and modifications to the compositions described herein that are also within the scope of the present invention.

REFERENCE SIGNS

1 Biopen
2 nozzle
3 handgrip
4 rear housing (reagent and batteries)
5 control module
6 power supply
7 drive train assembly
8 core reagent container (first container)
9 shell reagent container (second container)
10 frame
11 nozzle support
16 end stop
17 motor plate receiving surface
18 cavity for core reagent container
19 cavity for shell reagent container
20 nozzle assembly
21 manifold housing
22 tip
23 core aperture
24 UV light source
25 annular aperture
26 manifold (shell conduit)
27 retention rib
28 cavity to receive nozzle of first (core) reagent container
29 cavity to receive nozzle of second (shell) reagent container
31 handgrip housing
32 start button (cover)
33 start button actuator
35 reagent container support arrangement
36 hinge
37 latch for cover
41 rear housing—upper section
42 rear housing—lower section
43 aperture in upper section for speed control knob
44 retention tabs
61 batteries
62,63,65 wiring
64 tape
71 Drive cradle
72 drive cap
73 jack screw
74 jack spur gear
75 stepper motor
100 triple concentric syringe
120 nozzle
121 outer tube 122 intermediate tube
123 core tube
124 cap manifold
125 seal
126 intermediate manifold
127 seal
128 nozzle base
131,132,133 syringes
141,142,143 plungers; reagent piston
151,152,153 jack screws
161,162,163 plunger actuators
171,172,173 stepper motors
222 conduit for LED cable
223,226,228,229 conduit
224 manifold plug
225 light pipe
231 rear shoulder
232 rear support projection
240 UV LED
242 light pipe
244 light pipe support
270 tip cap
271 cap portion of tip 21
272 rear portion of tip 21
273 cavity for hypodermic support tip
274 seal
275 front aperture for light pipe
276 seal recess
277 rear aperture for light pipe
278 hypodermic support tip
279 recess
711 anti rotation motor mount
712 retaining plate
713 drive shaft seals
714 motor cover
800 robot-mounted 3D printing apparatus
810 multiaxial jointed robot-arm
820 mount
830 foot
840 nozzle

What is claimed is:

1. A robot-mounted 3D printing apparatus for extruding multiple reagent compositions, the apparatus comprising:
    a detachable 3D printing device, wherein the detachable 3D printing device is a handheld device, comprising:
    a housing comprising:
        a first reagent container support arrangement which in use receives and supports a first reagent container containing a cell supporting reagent as a first reagent;
        a second reagent container support arrangement and a first reagent container supported by the first reagent container support arrangement containing a light curable reagent as a second reagent;
    a power supply;
    an electric drive train arrangement driving a first reagent piston into a distal end of the first reagent container, and driving a second reagent piston into a distal end of the second reagent container;
    an electronic control circuit controlling the electric drive train arrangement controlling extrusion of the cell supporting and light curable reagents from the first and second reagent containers; and
    a nozzle connected at a distal end to the housing and comprising a co-extrusion tip comprising at least one aperture, and a first conduit receiving the first reagent driven out of a proximal end of the first reagent container and directing the first reagent out of the at least one aperture in the co-extrusion tip, and a second conduit receiving the second reagent driven out of a proximal end of the second reagent container and directing the second reagent out of the at least one aperture in the co-extrusion tip;
    a multiaxial jointed robot-arm; and
    a mount attached to one end of the multiaxial jointed robot-arm, wherein the mount holds the detachable 3D printing device via connection parts; and wherein the mount is 360 degree rotatable and allows loading and replenishing of the reagent containers, wherein controls of the detachable 3D printing device are transferred to a robot control system via the connection parts.

2. The robot-mounted 3D printing apparatus as claimed in claim 1, wherein the electric drive train arrangement interfaces with standard commonly available syringe systems.

3. The robot-mounted 3D printing apparatus as claimed in claim 1, further comprising a light source mounted on or in the detachable 3D printing device and controlled by the electronic control circuit for curing the first and second reagents either just prior or after extrusion from the co-extrusion tip.

4. The robot-mounted 3D printing apparatus as claimed in claim 1, further comprising a light source, wherein the light source is mounted remote to the detachable 3D printing device.

5. The robot-mounted 3D printing apparatus as claimed in claim 4, wherein the light source is mounted on the multi-axial jointed robot-arm or wherein the light source is a separate device remote from the robot-mounted 3D printing apparatus.

6. The robot-mounted 3D printing apparatus as claimed in claim 1, wherein the housing further comprises a hinged portion to allow the housing to be opened to receive and load the first and second reagent container while the detachable 3D printing device is mounted to the apparatus.

7. The robot-mounted 3D printing apparatus as claimed in claim 6, further comprising an upper housing component to flip through the hinged portion through at least 90° up to 270° to provide internal access to allow loading of the first and second reagent containers.

8. The robot-mounted 3D printing apparatus as claimed in claim 7, wherein the upper housing component is completely removable.

9. The robot-mounted 3D printing apparatus as claimed in claim 1, further comprising a first aperture for viewing the first reagent in the first reagent container, and a second aperture for viewing the second reagent in the second reagent container or wherein an upper portion of the housing is transparent to allow viewing of the reagent containers and actuators, wherein optionally a frame and the upper portion of the housing are embossed with lettering to locate the reagents in the correct position.

10. The robot-mounted 3D printing apparatus as claimed in claim 1, wherein a rate of extrusion of the first and second reagents is independently controllable, or a rate of extrusion of the first and second reagents is a mechanically fixed ratio.

11. The detachable 3D printing device as claimed in claim 1, further comprising one or more additional reagent container support arrangements which in use each receives and supports an additional reagent container comprising an additional reagent, and wherein the electric drive train arrangement is further configured to drive an additional reagent piston into a distal end of each additional reagent container, and the nozzle is further configured to receive the additional reagent driven out of a proximal end of each additional reagent container and co-extrude each additional reagent with the first and second reagents, wherein the detachable 3D printing device is adapted to be held by a 360 degree rotatable mount of a robot-arm by connection parts, wherein controls of the detachable 3D printing device are transferred to a robot control system via the connection parts.

12. The robot-mounted 3D printing apparatus as claimed in claim 1, wherein one or more of curing controls and extrusion controls are integrated into the robot control system.

13. The robot-mounted 3D printing apparatus as claimed in claim 1, wherein the nozzle is attachable to and removable from the housing while the detachable 3D printing device is mounted to the apparatus.

14. The robot-mounted 3D printing apparatus as claimed in claim 1, wherein the multiaxial jointed robot-arm is 6-axis or 3-axis.

15. A method of using robot-mounted 3D printing apparatus of claim 1, comprising extruding radiation curable reagent compositions.

* * * * *